(12) United States Patent
Gower et al.

(10) Patent No.: US 8,657,308 B2
(45) Date of Patent: Feb. 25, 2014

(54) PUSHING VEHICLE FOR TRANSPORTING A CHILD, MODULAR SUPPORTING SYSTEM, AND COMPONENTS

(71) Applicant: Phil and Teds Most Excellent Buggy Company Limited, Wellington (NZ)

(72) Inventors: Campbell Gower, Kelburn (NZ); James Richard Andrews, Brooklyn (NZ)

(73) Assignee: Phil and Teds Most Excellent Buggy Company Limited, Newtown, Wellington (NZ)

( * ) Notice: Subject to any disclaimer, the term of this patent is extended or adjusted under 35 U.S.C. 154(b) by 0 days.

(21) Appl. No.: 13/769,645

(22) Filed: Feb. 18, 2013

(65) Prior Publication Data
US 2013/0154322 A1    Jun. 20, 2013

Related U.S. Application Data

(63) Continuation of application No. 12/880,987, filed on Sep. 13, 2010, now Pat. No. 8,398,096.

(60) Provisional application No. 61/241,644, filed on Sep. 11, 2009.

(51) Int. Cl.
*B62B 7/14* (2006.01)
(52) U.S. Cl.
USPC ............... 280/47.18; 280/47.41; 280/47.38; 280/648; 297/256.16
(58) Field of Classification Search
USPC ............. 280/47.18, 639, 642, 643, 646, 647, 280/648, 650, 42, 47.25, 47.26, 47.38, 47.4, 280/655.1, 657, 658, 43, 47.41; 297/184.11, 184.13, 184.17, 228.13, 297/229, 250.1, 251, 256, 256.16, 118
See application file for complete search history.

(56) References Cited

U.S. PATENT DOCUMENTS 3,550,998 A * 12/1970 Korol et al. .................. 280/31
4,116,464 A    9/1978 Haley
4,598,946 A * 7/1986 Cone ........................ 297/258.1
4,762,331 A * 8/1988 Tucker et al. ................ 280/30
(Continued)

FOREIGN PATENT DOCUMENTS

DE         19934074 A1    2/2001
DE     102007047578 A1    4/2009
(Continued)

OTHER PUBLICATIONS

European Search Report for application No. EP 10176102.1 dated May 20, 2011, 13pp.

*Primary Examiner* — Katy M Ebner
*Assistant Examiner* — Brodie Follman
(74) *Attorney, Agent, or Firm* — Perkins Coie LLP

(57) ABSTRACT

A pushing vehicle is described for transporting at least one child, including:
a wheeled chassis including a chassis frame and a plurality of wheels that are rotatably mounted relative to the chassis frame to support the chassis frame above a ground surface and which enable the chassis to be moved along the ground surface;
a passenger support for supporting a child;
wherein the passenger support is attachable to the frame in a mounting position by a single tool-less attachment mechanism for attaching an underside of the passenger support to the chassis frame, to support the passenger support generally above the wheeled chassis.

Also described are related modular seating systems and a supporting compartment.

11 Claims, 12 Drawing Sheets

(56) References Cited

U.S. PATENT DOCUMENTS

| | | | |
|---|---|---|---|
| 4,768,795 A * | 9/1988 | Mar | 280/30 |
| 4,946,180 A * | 8/1990 | Baer | 280/39 |
| 4,953,880 A | 9/1990 | Sudakoff et al. | |
| 5,092,004 A * | 3/1992 | Cone et al. | 5/94 |
| D326,437 S * | 5/1992 | Kuhl et al. | D12/128 |
| 5,127,120 A * | 7/1992 | Mason | 5/655 |
| 5,370,408 A | 12/1994 | Eagan | |
| 5,375,869 A * | 12/1994 | Hsiao | 280/648 |
| 5,496,094 A * | 3/1996 | Schwartzkopf et al. | 297/45 |
| 5,676,386 A | 10/1997 | Huang | |
| 5,823,547 A * | 10/1998 | Otobe et al. | 280/30 |
| 6,286,844 B1 * | 9/2001 | Cone et al. | 280/47.41 |
| 6,298,949 B1 | 10/2001 | Yang et al. | |
| 6,446,990 B1 * | 9/2002 | Nania et al. | 280/47.371 |
| 6,513,827 B1 * | 2/2003 | Barenbrug | 280/648 |
| 6,561,537 B1 | 5/2003 | Chen | |
| 6,594,840 B2 * | 7/2003 | Tomas et al. | 5/655 |
| 6,817,451 B1 | 11/2004 | Chen | |
| 7,032,922 B1 * | 4/2006 | Lan | 280/648 |
| 7,040,706 B2 | 5/2006 | Koffler | |
| 7,070,197 B2 * | 7/2006 | Chen | 280/642 |
| 7,267,359 B1 | 9/2007 | Yang et al. | |
| 7,367,581 B2 | 5/2008 | Yang | |
| 7,377,537 B2 * | 5/2008 | Li | 280/650 |
| 7,455,353 B2 * | 11/2008 | Favorito (nee Wilkins) et al. | 297/16.1 |
| 7,464,957 B2 * | 12/2008 | Worth et al. | 280/642 |
| 7,475,900 B2 * | 1/2009 | Cheng | 280/642 |
| 7,497,461 B2 * | 3/2009 | Emerson | 280/642 |
| 7,513,512 B2 * | 4/2009 | Yoshie et al. | 280/47.38 |
| 7,658,399 B2 * | 2/2010 | Van Dijk | 280/642 |
| 7,686,323 B2 | 3/2010 | Chen | |
| D622,640 S * | 8/2010 | Gower et al. | D12/129 |
| 7,784,801 B2 | 8/2010 | Yeh | |
| D623,096 S * | 9/2010 | Gower et al. | D12/129 |
| 7,832,755 B2 * | 11/2010 | Nolan et al. | 280/642 |
| 7,832,756 B2 * | 11/2010 | Storm | 280/642 |
| 7,938,435 B2 * | 5/2011 | Sousa et al. | 280/658 |
| 8,033,555 B2 * | 10/2011 | Mostert et al. | 280/47.38 |
| 8,061,732 B2 * | 11/2011 | Song et al. | 280/650 |
| 8,100,429 B2 | 1/2012 | Longenecker et al. | |
| 8,172,243 B2 * | 5/2012 | Dresher | 280/47.38 |
| 8,172,254 B2 | 5/2012 | Park et al. | |
| 8,215,661 B2 | 7/2012 | Van Dijk | |
| 8,251,382 B2 | 8/2012 | Chen et al. | |
| 8,256,792 B2 * | 9/2012 | Conrad et al. | 280/648 |
| 8,276,985 B2 * | 10/2012 | Kho et al. | 297/130 |
| 8,313,115 B2 * | 11/2012 | Cheng | 280/47.38 |
| 8,371,606 B2 * | 2/2013 | Gower et al. | 280/642 |
| 8,376,375 B2 * | 2/2013 | Mival et al. | 280/47.38 |
| 8,398,096 B2 * | 3/2013 | Gower et al. | 280/47.18 |
| 2002/0084626 A1 * | 7/2002 | Ageneau | 280/642 |
| 2003/0034211 A1 | 2/2003 | Iwata | |
| 2003/0111825 A1 * | 6/2003 | Lo et al. | 280/642 |
| 2004/0070238 A1 * | 4/2004 | Moser et al. | 297/183.9 |
| 2004/0124611 A1 * | 7/2004 | Gong et al. | 280/642 |
| 2005/0023872 A1 * | 2/2005 | Hetzel et al. | 297/256.16 |
| 2005/0242549 A1 * | 11/2005 | Longenecker et al. | 280/642 |
| 2006/0103085 A1 * | 5/2006 | Sanchez | 280/30 |
| 2007/0069505 A1 * | 3/2007 | Li | 280/642 |
| 2007/0126195 A1 * | 6/2007 | Dresher | 280/47.38 |
| 2008/0042476 A1 * | 2/2008 | Hei et al. | 297/118 |
| 2008/0258527 A1 * | 10/2008 | Gower et al. | 297/256.15 |
| 2009/0001776 A1 * | 1/2009 | Bearup et al. | 297/153 |
| 2009/0121455 A1 | 5/2009 | Kretschmer et al. | |
| 2009/0127808 A1 | 5/2009 | Otterson | |
| 2009/0243260 A1 * | 10/2009 | Longenecker et al. | 280/642 |
| 2009/0295128 A1 * | 12/2009 | Nagelski et al. | 280/642 |
| 2009/0315299 A1 * | 12/2009 | Barenbrug | 280/642 |
| 2010/0001492 A1 * | 1/2010 | Driessen | 280/642 |
| 2010/0038887 A1 * | 2/2010 | Bar-Lev | 280/658 |
| 2010/0140902 A1 * | 6/2010 | Zehfuss | 280/650 |
| 2011/0012324 A1 | 1/2011 | Yeh et al. | |
| 2011/0031708 A1 * | 2/2011 | Cheng | 280/47.38 |
| 2011/0062676 A1 * | 3/2011 | Gower et al. | 280/47.38 |
| 2011/0163518 A1 * | 7/2011 | Song | 280/642 |
| 2011/0163519 A1 * | 7/2011 | Van Gelderen et al. | 280/642 |
| 2011/0193325 A1 | 8/2011 | Li | |
| 2012/0025495 A1 * | 2/2012 | Minato et al. | 280/648 |
| 2012/0086188 A1 * | 4/2012 | Conrad et al. | 280/647 |
| 2012/0193893 A1 * | 8/2012 | Conrad et al. | 280/647 |
| 2012/0261957 A1 * | 10/2012 | Tadin et al. | 297/250.1 |
| 2012/0261961 A1 * | 10/2012 | Heisey et al. | 297/256.16 |
| 2012/0274050 A1 * | 11/2012 | Shaanan et al. | 280/648 |

FOREIGN PATENT DOCUMENTS

| | | |
|---|---|---|
| EP | 1693277 A2 | 8/2006 |
| EP | 2197693 A2 | 6/2010 |
| GB | 1477274 | 6/1977 |
| JP | 2002087277 | 3/2002 |
| WO | 2009/035342 | 3/2009 |
| WO | 2010/020976 A1 | 2/2010 |

* cited by examiner

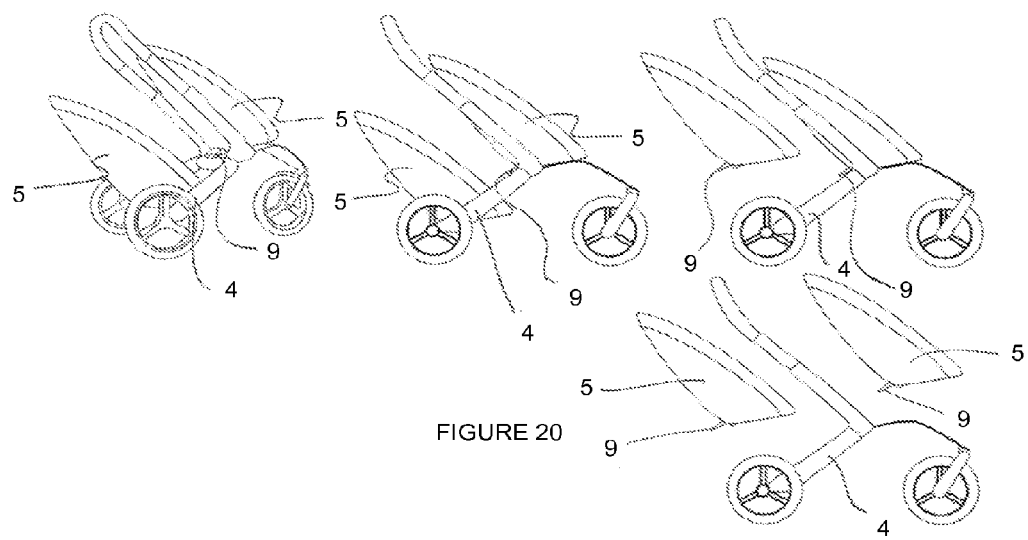
FIGURE 20
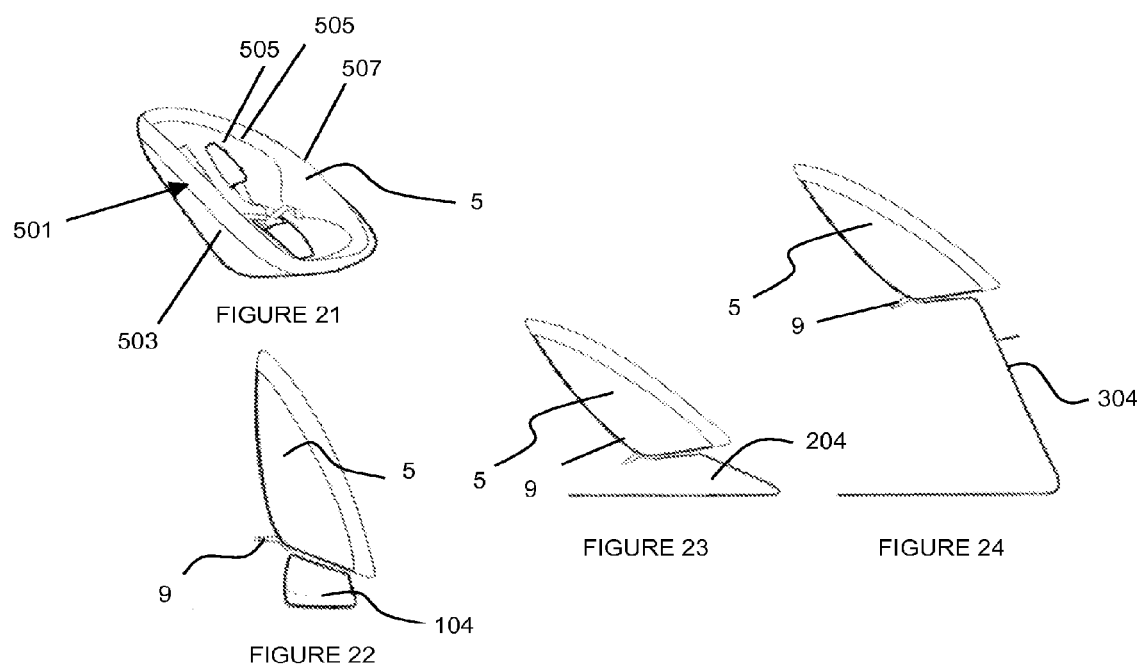
FIGURE 21
FIGURE 22
FIGURE 23
FIGURE 24

PUSHING VEHICLE FOR TRANSPORTING A CHILD, MODULAR SUPPORTING SYSTEM, AND COMPONENTS

This application is a continuation of U.S. application Ser. No. 12/880,987, filed Sep. 13, 2010, which claims priority to U.S. Provisional Application No. 61/241,644, filed Sep. 11, 2009, each of which are hereby incorporated by reference in their entirety.

FIELD OF THE APPLICATION

Described herein is a pushing vehicle for transporting a child for transporting a baby, toddler, or young child. Further described is a modular supporting system and a supporting compartment for a child product.

BACKGROUND

Conventionally, babies and toddlers have been transported in a buggy. It is generally desirable that a buggy has a compact collapsed storage configuration, so it can be readily transported when not in use. Some buggies can fold, but they still take up a significant amount of space when folded.

Some buggies have seats that are removable. Some of the seats are removable with the use of tools, while other seats are removable without tools. However, even without the use of tools, those buggies typically require two attachment points at each side of seat. Those attachment points require the user to use both hands to disconnect or connect the attachment points when removing the seat from the frame or attaching the seat to the frame, which can be awkward especially if the baby or toddler is sitting in the seat.

Buggies are often used on a variety of terrains. Typically, the only part of a buggy that will attempt to absorb the impact as the buggy travels over rough terrain are pneumatic tyres. The pneumatic tyres are not usually sufficient if the buggy is used off-road.

Generally, different types of child carrying or supporting products are independent products, which results in extra expense to a purchaser. It would be desirable to share components between different child products.

In this specification where reference has been made to patent specifications, other external documents, or other sources of information, this is generally for the purpose of providing a context for discussing the features of the pushing vehicle described herein. Unless specifically stated otherwise, reference to such external documents or such sources of information is not to be construed as an admission that such documents or such sources of information, in any jurisdiction, are prior art or form part of the common general knowledge in the art.

It is acknowledged that the term 'comprise' may, under varying jurisdictions, be attributed with either an exclusive or an inclusive meaning. For the purpose of this specification, and unless otherwise noted, the term 'comprise' shall have an inclusive meaning—i.e. that it will be taken to mean an inclusion of not only the listed components it directly references, but also other non-specified components or elements. This rationale will also be used when the term 'comprised' or 'comprising' is used in relation to one or more steps in a method or process.

Further aspects and advantages of the embodiments described herein will become apparent from the ensuing description that is given by way of example only.

SUMMARY

In broad terms there is described a pushing vehicle such as a buggy as well as a modular supporting system and a supporting compartment for a child product. One of the key attributes described is a tool-less attachment mechanism for releasably attaching a support compartment such as a seat to a chassis frame.

For the purposes of this specification, the term 'child buggy', 'buggy', 'perambulator' and grammatical variations thereof collectively refer to child carrying and supporting products used to transport one or more children. The child/children may be babies or toddlers.

In some embodiments there is provided a pushing vehicle for transporting at least one child, including:
  a wheeled chassis including a chassis frame and a plurality of wheels that are rotatably mounted relative to the chassis frame to support the chassis frame above a ground surface and which enable the chassis to be moved along the ground surface;
  a passenger support for supporting a child;
  wherein the passenger support is attachable to the frame in a mounting position by a single tool-less attachment mechanism for attaching an underside of the passenger support to the chassis frame, to support the passenger support generally above the wheeled chassis.

In some embodiments, the pushing vehicle may be a buggy.

In some embodiments there is provided a modular seating system for supporting a child, the modular seating system including:
  a seat for supporting a child in a seated position;
  a first base including a wheeled buggy chassis including a chassis frame and a plurality of wheels that are rotatably mounted relative to the frame to support the frame above a ground surface and which enable the chassis to be moved along the ground surface, with the seat selectively attachable to the first base in a primary seating position to provide a wheeled buggy for transporting the child;
  a further base to which the seat is selectively attachable to provide an alternative child seating product;
  and a tool-less attachment mechanism for enabling the seat to be selectively attached to the first base in the primary seating position to provide the wheeled buggy or to the first base to provide the alternative child seating product, with the tool-less attachment mechanism composing a seat part that is mounted to the seat, a chassis part mounted to the chassis frame, and a further base part mounted to the further base, with the seat part of the tool-less attachment mechanism selectively engageable with the chassis part and the further base part to attach the seat to the first base or the further base.

In some embodiments there is provided a modular supporting system for supporting a child, the modular support system including:
  a supporting compartment for supporting a child;
  a first base to which the supporting compartment is selectively attachable to provide a child supporting product;
  and a further base to which the supporting compartment is selectively attachable to provide an alternative child supporting product;
  and a tool-less attachment mechanism including a supporting compartment part that is mounted to the supporting compartment, a first base part that is mounted to the first base, and a further base part mounted to the further base, with the supporting compartment part of the tool-less attachment mechanism selectively engageable with the first base part and the further base part to attach the supporting compartment to the first base or the further base.

In some embodiments there is provided a supporting compartment for supporting a child in a child product, the supporting compartment including:

a moulded contoured polymeric portion that includes a supporting region for at least partly supporting a child, and two side walls that extend from sides of the supporting region, wherein at least part of the moulded contoured polymeric portion is resilient; and a relatively rigid peripheral region that supports at least upper edges of the side walls of the moulded contoured polymeric portion.

BRIEF DESCRIPTION OF THE DRAWINGS

Preferred forms of the embodiments described herein will now be described by way of example only and with reference to the accompanying drawings in which:

FIG. 20 is a perspective view of an alternative chassis that provides for the attachment of two seats;

FIG. 21 is a perspective view of an alternative preferred form seat which includes a rigid shell and a resilient inner region; and FIGS. 22 to 27 are schematic drawings showing alternative bases and alternative passenger supporting compartments for use in a modular support system.

DETAILED DESCRIPTION

Figure 1:
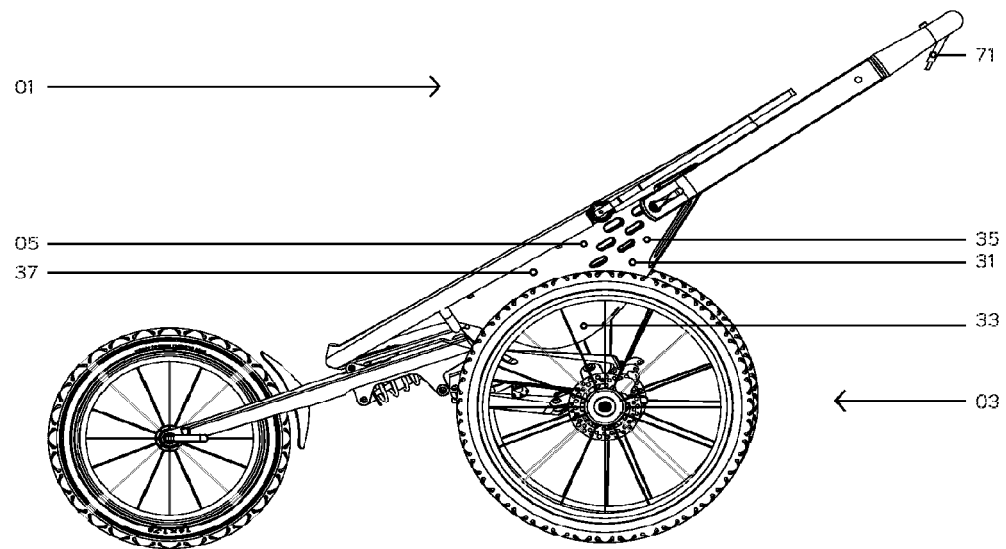
FIG. 1 is a side elevation view of a preferred form buggy in an in use configuration.

The embodiments are now described in further detail. As noted above, in broad terms there is described a pushing vehicle such as a buggy as well as a modular supporting system and a supporting compartment for a child product. One of the key attributes described is a tool-less attachment mechanism for releasably attaching a support compartment such as a seat to a chassis frame.

In some embodiments there is provided a pushing vehicle for transporting at least one child, including:

a wheeled chassis including a chassis frame and a plurality of wheels that are rotatably mounted relative to the chassis frame to support the chassis frame above a ground surface and which enable the chassis to be moved along the ground surface;

a passenger support for supporting a child;

wherein the passenger support is attachable to the frame in a mounting position by a single tool-less attachment mechanism for attaching an underside of the passenger support to the chassis frame, to support the passenger support generally above the wheeled chassis.

In some embodiments, the pushing vehicle may be a buggy.

In the above embodiments the passenger support may include a seat for supporting a child in a seated position. The seat may be supported from the chassis frame in a generally upright configuration when attached to the chassis frame.

Alternatively, the passenger support may include a bassinet for supporting baby or child in a lying position. In these embodiments, the bassinet may be supported from the chassis frame in a generally horizontal configuration when attached to the chassis frame. The bassinet may be an alternative passenger support to the seat described above. Alternatively, the seat described above may be supported from the chassis frame in a generally horizontal configuration when attached to the chassis frame to form a bassinet type passenger support.

For the purposes of this specification, the term 'single tool-less attachment mechanism' and grammatical variations thereof refers to a mechanism that has a single actuator to enable release of the attachment between the components. It should be appreciated that the single tool-less attachment mechanism may however, have multiple parts without departing from the scope of the embodiments described herein.

The term 'a tool-less attachment mechanism' and grammatical variations thereof refers to a mechanism that does not require a separate tool to operate the mechanism.

In the above embodiments, the tool-less attachment mechanism may be a quick release mechanism that enables release of the attachment through a simple, single action of the user.

In the above embodiments, the seat may be supported from the chassis frame only by the tool-less attachment mechanism, so all loading is transferred from the seat to the frame via the tool-less attachment mechanism.

In the above embodiments, the tool-less attachment mechanism may include a release actuator to enable a user to selectively release the seat from the chassis. The release actuator may be configured for single-handed use, so that a user can selective release the seat from the chassis using one hand, while supporting the seat with the other hand.

In the above embodiments, the tool-less attachment mechanism may include a seat part and a chassis part. In some embodiments, the tool-less attachment mechanism may include an engagement member on one of the chassis frame and the seat, and a slot that is complementary to the engagement member on the other of the chassis frame and the seat.

In the above embodiments, the tool-less attachment mechanism may include a pair of aligned slots. In the above embodiments, the engagement member may be at least partly received in the slot(s), to attach the seat to the chassis. In the above embodiments, the release actuator may be configured to enable a user to selectively release the seat from the chassis by releasing the engagement member from the slot(s).

In the above embodiments, the tool-less attachment mechanism may include a locking member to maintain the engagement member in the slot(s), until the engagement member is selectively released from the slot(s) by a user. The locking member may be biased into a locked configuration in which position, the engagement member is prevented from being released from the slot(s), and may be manually movable to a released configuration in which it enables the engagement member to be released from the slot(s).

In the above embodiments, the slot(s) may include an open end and a closed end, and the locking member includes a camming surface that may be biased into engagement with the engagement member to push the engagement member against the closed end of the slot(s) when the locking member is in the locked configuration. The locking member may be biased in any suitable way, and in some embodiments may be a torsion spring.

In the above embodiments, the locking member may be operatively connected to the release actuator, such that the release actuator may be operated by a user to move the locking member to the released configuration, to release the engagement member from engagement with the slot(s).

In the above embodiments, the release actuator may include a lever that is accessible from behind the buggy. The lever may be pushed downwardly and or forwardly to release the seat from the chassis frame. Alternatively, the actuator may be of a different type, such as a pushable button that may be accessible from behind the buggy.

In the above embodiments, the engagement member may be on the chassis frame, and the slot(s) may be on the seat. In an alternative configuration, the engagement member could be on the seat and the slot(s) on the chassis frame In the above embodiments, the tool-less attachment mechanism may include a further engagement member on one of the seat and the chassis frame, and a further slot that may be complementary to the further attachment on the other of the seat and the chassis frame. The further slot and engagement member may be spaced from the first slot and engagement member, and may be configured so that the seat can be attached to the chassis by initially engaging the further engagement member in the further slot, and pivoting the seat relative to the chassis frame so that the first slot and engagement member engage with each other.

The tool-less attachment mechanism may include a pair of aligned slots. The slot(s) and further slot(s) may be both positioned on one of the seat and chassis frame, and the engagement member and further engagement member are both positioned on the other of the seat and the chassis frame. The first slot(s) and further slot(s) may both be positioned on the seat. The further slot(s) may be forward slot(s) and may be forward-opening, and the first slot(s) may be rearward slot(s) and may be downward-opening.

In the above embodiments, the seat part of the tool-less attachment mechanism may be positioned beneath a forward portion of the seat. The tool-less attachment mechanism could be positioned beneath a derriere-supporting region of the seat. Alternatively, the tool-less attachment mechanism could be positioned beneath a leg-supporting region of the seat.

The seat may include a support frame and a seating portion that may be supported by the support frame. In that configuration, the seat part of the tool-less attachment mechanism could be mounted to part of the support frame. The support frame may have at least one cross-member, with the seat part of the tool-less attachment mechanism mounted to the cross-member. Alternatively, the seat may include a seating portion that is self-supporting, and the seat part of the tool-less attachment portion may be mounted to part of the seating portion.

In the above embodiments, the seating portion may be a moulded contoured polymeric component. The seating portion may include a suitable material, such as ethylene vinyl acetate (EVA) or polyethylene (PE) foam for example. The seating position may include medium density ethylene vinyl acetate, to provide the seating portion with resilience. The EVA may be formed as a closed-cell foam product. Polyethylene could be used if a more rigid seating portion is desired. The material may be a blend that incorporates any additives that are required to obtain desired properties.

In the above embodiments, the moulded contoured seating portion may include a derriere-supporting region, a back-supporting region, and two side walls that extend between sides of the derriere-supporting region and the back-supporting region. The seat may include a relatively rigid peripheral region that supports at least upper edges of the side walls of the seating portion. The relatively rigid peripheral region may also extend around and support outer edges of the back-supporting region and derriere-supporting region of the seating position. Alternatively, in embodiments in which the seating portion may further includes a leg-supporting region, the relatively rigid peripheral region may extend around and support the upper edges of the side walls, the outer edge of the back-supporting region, and an outer edge of the leg-supporting region. The upper edges of the side walls may not be substantially lower than a straight line extending between an outer edge of the back-supporting region and the derriere-supporting region or the leg-supporting region (if applicable), to provide a high-walled capsule. In embodiments having a seat support frame and the seating position, the relatively rigid peripheral region could be provided by the seat support frame, with the seating portion generally suspended from the seat support frame.

The seating portion may include at least one lip that engages with the support frame to mount the seating portion to the support frame. The lip(s) may be moulded with a curvature that at least partly encompasses part of the support frame to mount the seating position to the support frame.

Alternatively, the relatively rigid peripheral region could be incorporated into the moulding of the seat portion. For example, this could be achieved by co-moulding more rigid materials in to the seating portion to form the relatively rigid peripheral region.

The relatively rigid peripheral region could be provided by a relatively rigid polymeric moulded shell (such as a PE shell for example) that is positioned behind the relatively resilient portion, and supports at least the upper edges of the side walls of the relatively resilient portion. The shell may contact and support the rear sides of the relatively resilient portion, or a spacing may be provided therebetween, with the only contact being at the upper edges of the side walls, and optionally at the outer edges of the back-supporting region, derriere-supporting region, and/or leg-supporting region (if applicable).

In the above embodiments, the seat may include a handle that enables a user to push the buggy. The handle may be attached to or formed is part of the seat support frame, or may be moulded into the seating portion. With this configuration, when the seat is detached from the chassis, the handle may remain with the seat. The handle may be adjustable relative to the seat and may be selectively detachable from the seat. This configuration is particularly useful if the seat can be also be used in a modular seating system as outlined below. The handle may be foldable relative to the seat, to make a compact seat configuration for storage of the seat.

The chassis frame may also be foldable into a storage configuration for compact storage of the chassis frame. The chassis may include two rear wheels and at least one front wheel, and the chassis frame may have an in-use configuration in which the wheels are in a most distanced arrangement and a storage configuration in which the wheels are in a most compact arrangement.

In the above embodiments, the chassis may include a front arm to support the front wheel and two rear arms to support respective rear wheels, wherein the rear arms are selectively pivotable relative to the front arm to adjust the chassis frame between the in-use configuration and the storage configuration. Each rear arm may include a four bar linkage arrangement configured so that the rear wheels stay substantially parallel to one another as the chassis frame is adjusted between the in-use configuration and the storage configuration.

In the above embodiments, the chassis frame may include a suspension arrangement to provide and absorb movement between the front arm and the rear arms. The chassis frame may include a centre member that may be operatively connected to the rear arms and that is pivotally mounted to the front arm, and the suspension arrangement composes a shock absorber operatively connected to the centre member and the front arm. Each rear arm may be selectively pivotable relative to the centre member to adjust the chassis to the storage configuration.

In the above embodiments, the buggy may include a braking system that operates or at least one of the wheels to enable a user to selectively slow or stop the buggy. The braking system may include a braking actuator carried by the seat, and at least one braking member carried by the chassis, with the braking member(s) being selectively engageable to brake the wheel(s). The braking member(s) may be partially engageable to enable a user to slow the buggy without fully braking the buggy. The braking member(s) may include a drum brake or a disc brake.

In the above embodiments, the braking system may have a seat part that is carried by the seat, and a chassis part that is carried by the chassis. The seat part could be mounted to a seat frame, or to the seating portion. In some embodiments, when the seat is attached to the chassis, the seat part and the chassis part of the braking system may be "coupled", so that operation of the brake actuator will cause the brake member(s) to at least partially brake the wheel(s). It should be appreciated that the seat part and the chassis part of the braking system need not actually contact with one another until the brake actuator is operated. However, when the seat part and the chassis part of the braking system are coupled, they may be positioned such that operation of the brake actuator will cause the brake member(s) to at least partially brake the wheel(s). In some embodiments, when the seat is detached from the chassis, the seat part and the chassis part of the braking system may automatically decouple, and when the seat is attached to the chassis, the seat part and the chassis part of the braking system may automatically couple, so that the braking system needs no interaction from a user to separate the parts of the braking system.

In the above embodiments, the braking actuator may include a lever that can be actuated by a single hand of a user, and that is positioned on a handle of the buggy. The actuator could alternatively be of a different type. For example, the braking system actuation could be incorporated into the pushing handle of the buggy, so that pivoting the handle causes the braking member(s) to at least partially brake the wheel(s). Such an actuation system is described in our POT application number PCT/NZ2008/000174 (published as WO2009/035342), and the contents of that application are incorporated herein in their entirety by way of reference. However, for the present system, that braking system could be modified so that the seat can be detached from the chassis frame with a seat part of the braking system automatically decoupling from the chassis part In the above embodiments the chassis part of the braking system may include a sliding block that may be slidable relative to the chassis. The sliding block may be suitably connected to the braking member(s) via cable(s).

In the above embodiments, the seat part of the braking system may include a sliding block corresponding to the sliding block of the chassis pan. The sliding block may be slidable relative to the seat. The sliding block of the seat may be biased into engagement with the sliding block of the chassis part. The sliding block of the seat may be biased by any suitable mechanism, such as a compression spring for example.

In the above embodiments the sliding block may be connected to the brake actuator by a cable. Operation of the brake actuator may cause the sliding blocks to slide and the brake members will be activated to at least partially brake the wheels. The brake members may be biased into a non-braking position, which biases the sliding block of the chassis part into a non-braking position through the cables.

In the above embodiments, the seat may be attachable to the chassis frame in a primary seating position. When the seat is attached to the frame, the seat may be forward-facing. The seat may be detachable from the primary seating position and may be attachable to the frame in a secondary seating position which defines a second mounting position for the seat. The second mounting position may be at least partly behind and preferably at least partly below the primary seating position. When the seat is attached to the frame in the secondary seating position, the seat may be forward-facing.

The attachment of the seat in the secondary seating position may be via the same type of tool-less attachment mechanism as the attachment in the primary seating position. In such embodiments, the chassis frame may include two chassis parts of the tool-less attachment mechanism, with the seat part of the tool-less attachment mechanism being attachable to either of the chassis parts of the tool less attachment mechanism so the seat can be attached in the primary or secondary seating position.

In the above embodiments, the seat may include a harness or strap support for supporting a child in the seat. The harness may be a fixed harness, or may have adjustable straps. Such an adjustable harness system is described in our US Published Application No. 2008/0258527, and the contents of that application are incorporated herein in their entirety by way of reference.

In the above embodiments, the buggy may include two seats, each having a seat part of a tool-less attachment mechanism that may be engageable with either of two chassis parts of the tool-less attachment mechanism. Each seat is of the type outlined above, and may include a moulded contoured polymeric component.

The seat may be convertible from a sitting configuration for supporting a toddler to a lying configuration for supporting a baby. The tool-less attachment mechanism itself, or the position of the tool-less attachment mechanism relative to the seat or chassis frame, may be adjustable to provide the conversion. In embodiments in which the tool-less attachment mechanism may be movable relative to the seat to provide the conversion, the tool-less attachment mechanism may be under the derriere-supporting region or leg-supporting region of the seat in a sitting configuration, but under a back-supporting region of the seat in a lying configuration.

In some embodiments there is provided a modular seating system for supporting a child, the modular seating system including:
- a seat for supporting a child in a seated position;
- a first base including a wheeled buggy chassis including a chassis frame and a plurality of wheels that are rotatably mounted relative to the frame to support the frame above a ground surface and which enable the chassis to be moved along the ground surface, with the seat selectively attachable to the first base in a primary seating position to provide a wheeled buggy for transporting the child;
- a further base to which the seat is selectively attachable to provide an alternative child seating product;
- and a tool-less attachment mechanism for enabling the seat to be selectively attached to the first base in the primary seating position to provide the wheeled buggy or to the first base to provide the alternative child seating product, with the tool-less attachment mechanism composing a seat part that is mounted to the seat, a chassis part mounted to the chassis frame, and a further base part mounted to the further base, with the seat part of the tool-less attachment mechanism selectively engageable with the chassis part and the further base part to attach the seat to the first base or the further base.

In some embodiments there is provided a modular supporting system for supporting a child, the modular support system including:
- a supporting compartment for supporting a child;
- a first base to which the supporting compartment is selectively attachable to provide a child supporting product;
- and a further base to which the supporting compartment is selectively attachable to provide an alternative child supporting product;
- and a tool-less attachment mechanism including a supporting compartment part that is mounted to the supporting compartment, a first base part that is mounted to the first base, and a further base part mounted to the further base, with the supporting compartment part of the tool-less attachment mechanism selectively engageable with the first base part and the further base part to attach the supporting compartment to the first base or the further base.

The following options are applicable to the modular supporting systems described above.

In the above embodiments, the supporting compartment may include a seat for supporting a child in a seated position. The seat may be supported from the chassis frame in a generally upright configuration when attached to the chassis frame.

Alternatively the supporting compartment may include a bassinet for supporting a baby or child in a lying position. The bassinet may be supported from the frame in a generally horizontal configuration when attached to the frame. The bassinet may be an alternative supporting compartment to the seat described above. Alternatively, the seat described above may be supported from the frame in a generally horizontal configuration when attached to the frame to form a bassinet-type supporting compartment.

The modular seating or support system may have a single seat or supporting compartment, or may have a plurality of seats or supporting compartments. The plurality of seats or supporting compartments may differ from each other.

In the above embodiments, the further base may include one of: a high chair frame, a bouncer frame, and a car seat frame.

In the above embodiments the seat or supporting compartment may be released from engagement with a respective base by operation of a single actuator.

In the above embodiments, the modular seating or supporting system may include a plurality of said further bases, each of which includes a further base part of the tool-less attachment mechanism so the seat or supporting compartment can be selectively attached to the further bases.

The modular seating or supporting system may have any one or more features outlined in relation to the first aspect above.

In some embodiments there is provided a supporting compartment for supporting a child in a child product, the supporting compartment including:
- a moulded contoured polymeric portion that includes a supporting region for at least partly supporting a child, and two side walls that extend from sides of the supporting region, wherein at least part of the moulded contoured polymeric portion is resilient; and
- a relatively rigid peripheral region that supports at least upper edges of the side walls of the moulded contoured polymeric portion.

In the above embodiments, the supporting compartment may include a seat having a seating portion, and the supporting region includes a derriere-supporting region and a back supporting region of the seating position, and the side walls extend between the sides of the derriere-supporting region and the back-supporting region. The derriere-supporting region and the back-supporting region may be angled relative to one another.

Alternatively, the supporting compartment may include a product for supporting a child in a lying position, such as a bassinet for example, and the supporting region is adapted to support the child in a lying position. The moulded contoured polymeric portion may preferably have a head surrounding region to generally surround the child's head and a feet surrounding region to generally surround the child's feet, with the head surrounding region, feet surrounding region, and the side walls extending generally upwardly from a base of the supporting region.

In the above embodiments, the supporting compartment may further include a supporting compartment part of a single tool-less attachment mechanism for attaching an underside of the supporting compartment to a base, to support the supporting compartment generally above the base.

in the above embodiments, when the supporting compartment includes a seat, the back-supporting region may also form a head-supporting region.

In the above embodiments, the moulded contoured polymeric portion may include a suitable material, such as ethylene vinyl acetate (EVA). The moulded contoured polymeric portion may include a medium density ethylene vinyl acetate, to provide the seating portion with resilience. The material may be a blend that incorporates any additives that are required to obtain desired properties.

When the supporting compartment includes a seat, the relatively rigid peripheral region may optionally also extend around and support outer edges of the back-supporting region and derriere-supporting region of the seating portion. When the supporting compartment includes a product for supporting a child in a lying position, the relatively rigid peripheral region may optionally also extend around and support outer edges of the head surrounding region and feet surrounding region.

In the above embodiments, in embodiments in which the seating portion further includes a leg supporting region, the relatively rigid peripheral region may extend around and support the upper edges of the side walls, the outer edge of the back-supporting region, and an outer edge of the leg-supporting region.

In the above embodiments, when the supporting compartment includes a seat, the upper edges of the side walls may not be substantially lower than a straight line extending between an outer edge of the back-supporting region and the derriere-supporting region or the leg-supporting region, to provide a high-walled capsule. When the supporting compartment includes a product for supporting a child in a lying position, the upper edges of the side walls are not substantially lower than a straight line extending between an upper edge of the head surrounding region and an upper edge of the feet surrounding region to provide a high-walled capsule.

The relatively rigid peripheral region could be provided by a support frame, with the moulded contoured polymeric portion generally suspended from the support frame. The moulded contoured polymeric portion composes at least one lip that engages with the support frame to mount the seating portion to the support frame. The lip(s) is/are moulded with a curvature that at least partly encompasses part of the support frame to mount the moulded contoured polymeric portion to the support frame.

Alternatively, the rigid peripheral region may be co-moulded with the moulded contoured polymeric portion. In these alternative embodiments, the rigid peripheral region may be a polymeric component.

Alternatively, the relatively rigid peripheral region could be incorporated into the moulding of the moulded contoured polymeric portion. For example, this could be achieved by moulding more rigid materials such as a metallic frame into the relatively rigid portions of the moulded contoured polymeric portion.

The moulded contoured polymeric portion may be formed by moulding sheet laminates into the polymeric component to have relatively hard and relatively soft parts of the moulded contoured polymeric portion. For example, the moulded contoured polymeric portion may be provided with a relatively soft cushion region, with relatively hard supporting regions.

The relatively rigid peripheral region could be provided by a relatively rigid polymeric moulded shell (such as a PE shell for example) that is positioned behind the relatively resilient portion, and supports at least the upper edges of the side walls of the relatively resilient portion. The shell may contact and support the rear sides of the relatively resilient portion, or a spacing may be provided therebetween, with the only contact being at the upper edges of the side walls, and optionally at the outer edges of the back-supporting region, derriere-supporting region, and/or leg-supporting region (if applicable). The seat part of a single tool-less attachment mechanism may be mounted to or in the relatively rigid shell.

The seat or supporting compartment may have one or more features outlined in relation to the pushing vehicle described in greater detail above.

In some embodiments, a child product including a support and a supporting compartment as described in greater detail above is disclosed.

In the above embodiments the child product may be a buggy, a high chair, a bouncer, or a car seat.

The product may have one or more features outlined in relation to the pushing vehicle described in greater detail above.

The embodiments described above may also be said broadly to include the parts, elements and features referred to or indicated in the specification of the application, individually or collectively, and any or all combinations of any two or more said parts, elements or features, and where specific integers are mentioned herein which have known equivalents in the art to which the embodiments relate, such known equivalents are deemed to be incorporated herein as if individually set forth.

Where specific integers are mentioned herein which have known equivalents in the art to which this application relates, such known equivalents are deemed to be incorporated herein as if individually set forth.

Working Examples

Figure 2:
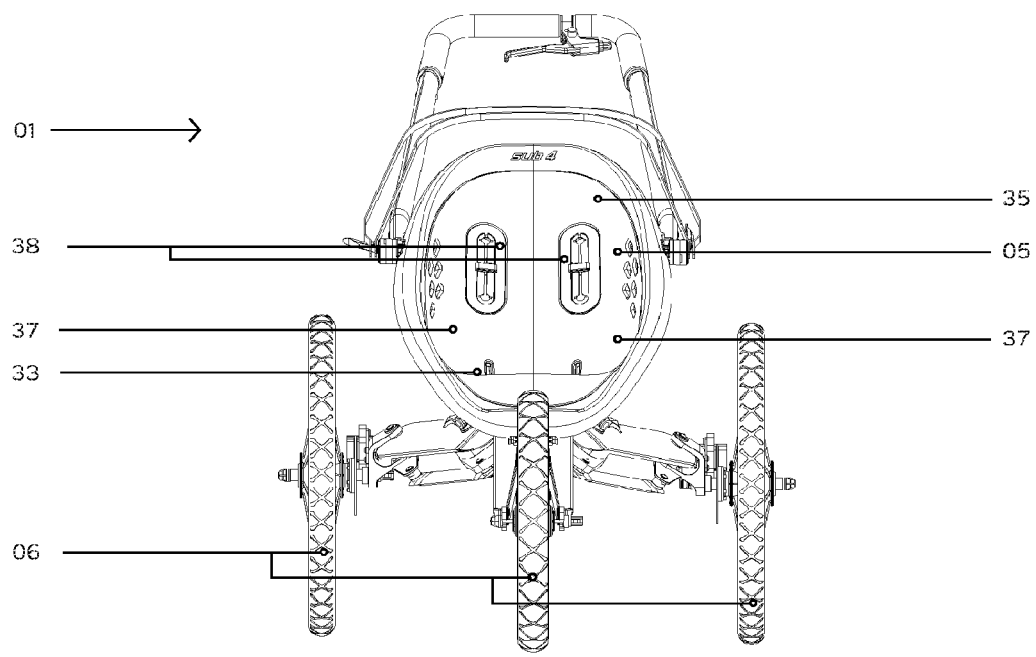
FIG. 2 is a front elevation view of the buggy of FIG. 1.
Figure 3:
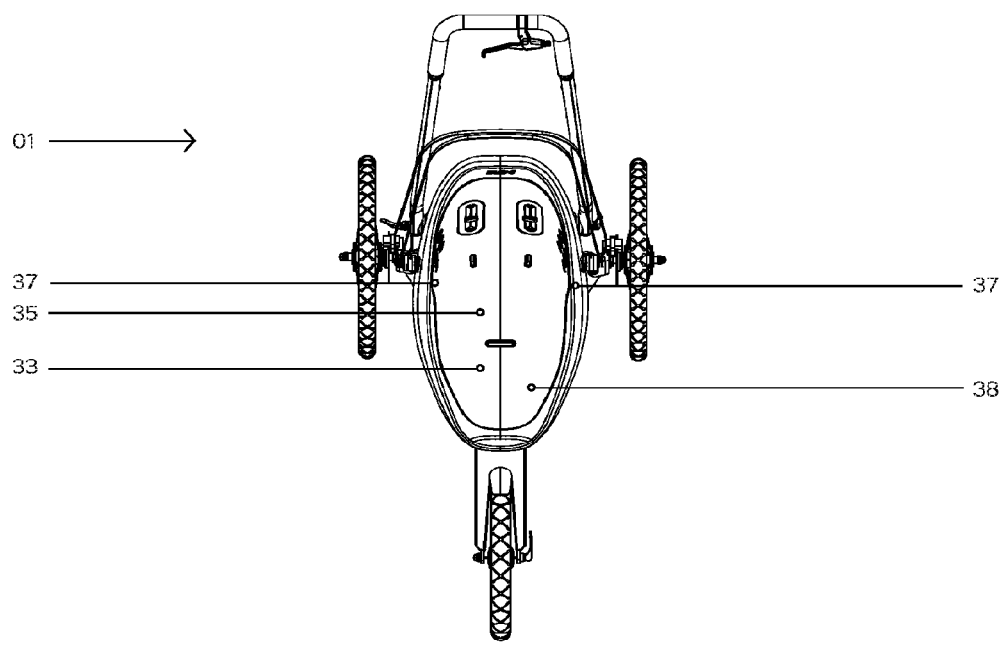
FIG. 3 is an overhead view of the buggy of FIG. 1.

Referring to FIGS. 1 to 3, a preferred form pushing vehicle for transporting a baby or toddler is indicated by reference numeral 1 and is shown in an in use configuration. The preferred form pushing vehicle is a buggy. The buggy has a wheeled chassis 3, a passenger support compartment in the form of a seat 5 for supporting a child in a seated position, and a single tool-less attachment mechanism.

Figure 4:
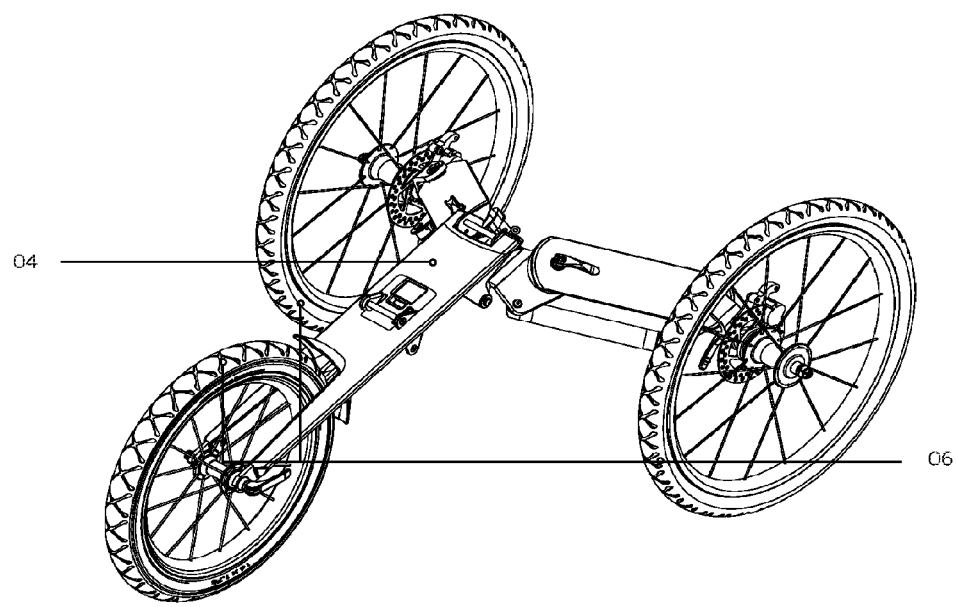
FIG. 4 is a perspective view of the buggy of FIG. 1 with the seat removed, showing the chassis.
Figure 5:
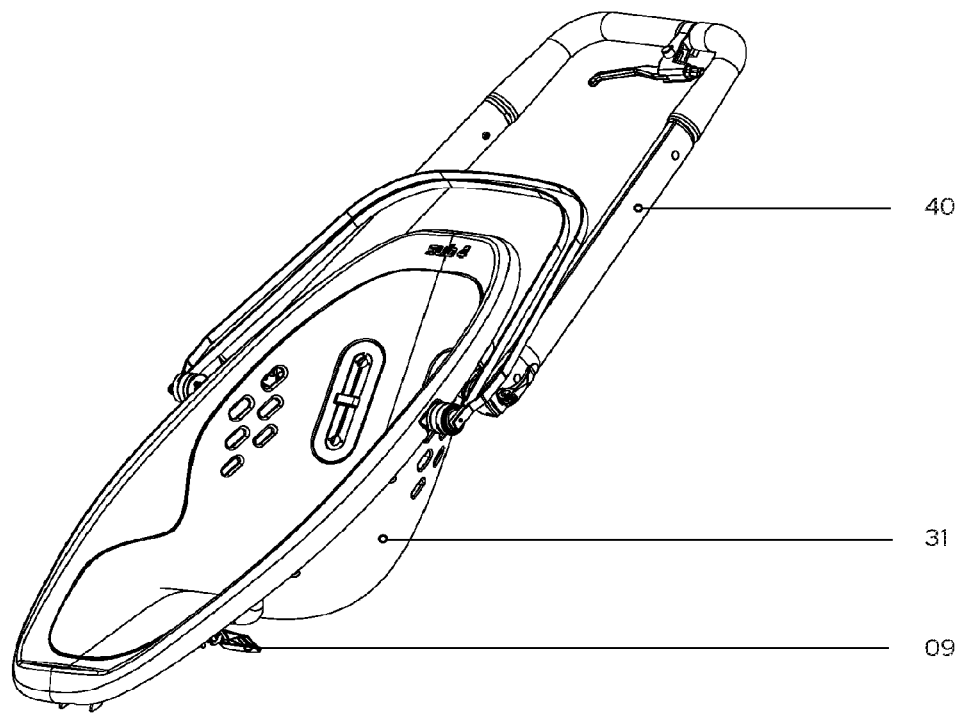
FIG. 5 is a perspective view of the seat of the buggy with the chassis removed.

With reference to FIG. 4, the chassis has a chassis frame 4 and a plurality of wheels 6 that are rotatably mounted relative to the frame 4 to support the frame above a ground surface and which enable the buggy to be moved along the ground surface.

The tool-less attachment mechanism attaches an underside of the seat 5 to the chassis frame 4, to support the seat generally above the wheeled chassis. The wheels are preferably provided with pneumatic tyres.

Tool-Less Attachment

Figure 6:
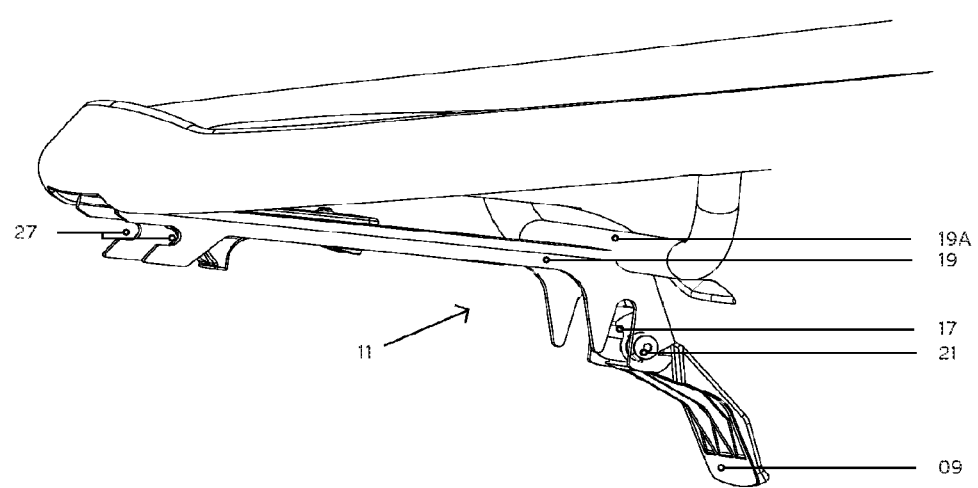
FIG. 6 is a perspective view of the seat part of the single tool-less attachment mechanism.
Figure 7:
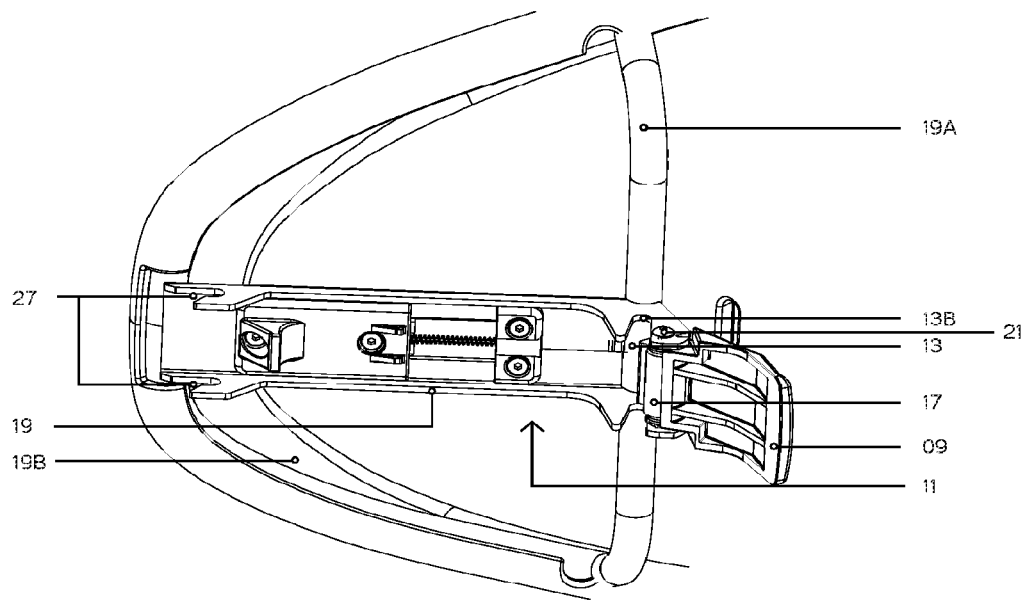
FIG. 7 is a perspective view from below of the seat part of the single tool-less attachment mechanism.
Figure 8:
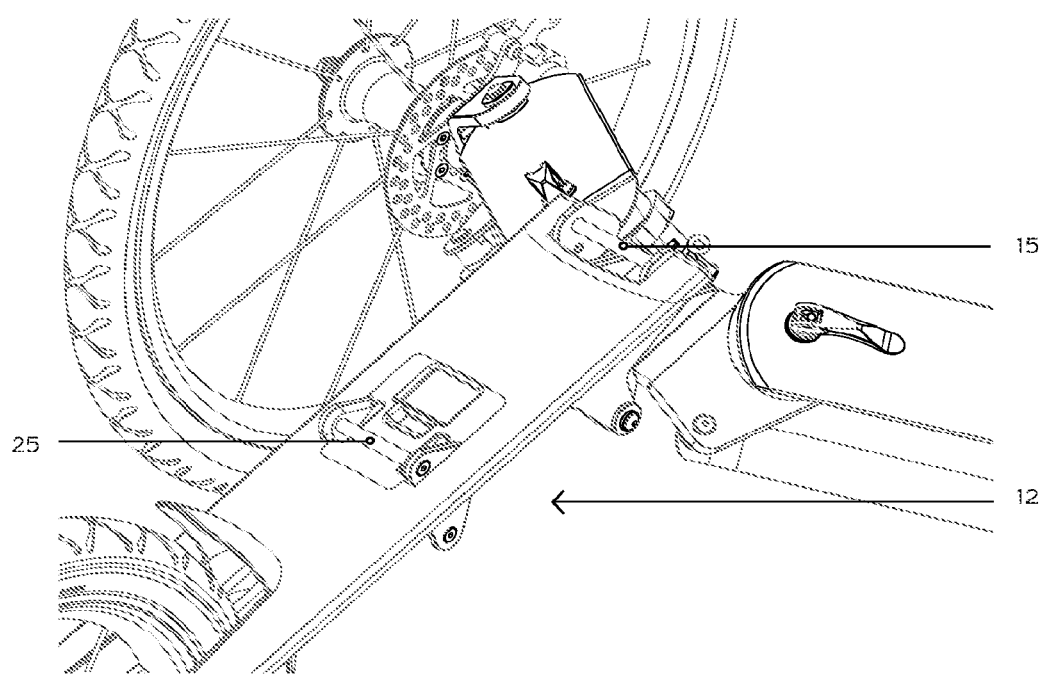
FIG. 8 is a perspective view of the chassis part of the single tool-less attachment mechanism.

Referring to FIG. 6, the fool-less attachment mechanism composes a release actuator, in the form of a lever 9, to enable a user to selectively release the seat 5 from the chassis 3. The lever 9 is configured for single-handed use, so that a user can selectively release the seat 5 from the chassis 3 using one hand, while supporting the seat with the other hand. The lever 9 is accessible from behind the buggy and the seat is released from the chassis frame 4 by being pushed downwardly and/or forwardly, so the locking member described below clears the slot.

The seat 5 is supported from the chassis frame 4 in a generally upright configuration when attached to the chassis frame. In the form shown, the back-supporting region of the seat is reclined from vertical, to provide a relaxed seating configuration for the occupant.

The tool-less attachment mechanism is a quick release mechanism that enables release of the attachment through a simple, single action of the user.

The seat 5 is supported in a rearward cantilevered manner from the chassis frame 4 only by the tool-less attachment mechanism, so all loading is transferred from the seat to the chassis frame through the tool-less attachment mechanism. The seat self-supports from the tool-less attachment mechanism.

Referring to FIGS. 6 to 9, the tool-less attachment mechanism has a passenger support compartment part in the form of a seat part 11 and a chassis part 12. The chassis part includes an engagement member 15 such as a pin on the chassis frame 4 and the seat part 11 includes a pair of slots 13 that are complementary to the engagement member. In the preferred form, the seat 5 has a bracket 19 in which the slots 13 are formed. The bracket is mounted to two chassis frame cross members 19a, 19b of the seat.

Alternatively, the seat part may have a single slot formed in the bracket or more than two aligned slots that are complementary to the engagement member. Each of the slots 13 includes an open end 13a and a closed end 13b. The engagement member 15 can be at least partly received in each of the slots 13, to attach the seat 5 to the chassis 3. The lever 9 is configured to enable a user to selectively release the seat 5 from the chassis 3 by releasing the engagement member 15 from the slots 13.

The tool-less attachment mechanism includes a locking member 17 to maintain the engagement member 15 in the slots 13, until the engagement member is selectively released from the slots by a user operating the lever 9. The locking member 17 is pivotally attached to the bracket by a pivot pin 21. The locking member 17 is biased into a locked configuration by a torsion spring (not visible) in which the camming surface described below extends at least partly across the slot. In the locking configuration, the locking member 17 secures the engagement member 15 and prevents the engagement member from being released from the slots 13. The locking member 17 is manually movable from the locked configuration to a released configuration in which it enables the engagement member to be released from the slots 13. The locking member 17 is operatively connected to the lever 9, such that the lever 9 can be operated by a user to move the locking member to the released configuration.

In the preferred form, the lever 9 and locking member 17 are fixed together. The lever 9 and locking member 17 are separate components that are keyed together. Alternatively those parts may be integrally formed as a single component. The lever 9 extends from the pivot pin 21 in a direction away from the slots 13 and the locking member 17 extends from the pivot pin in a direction towards the slots.

Figure 9:
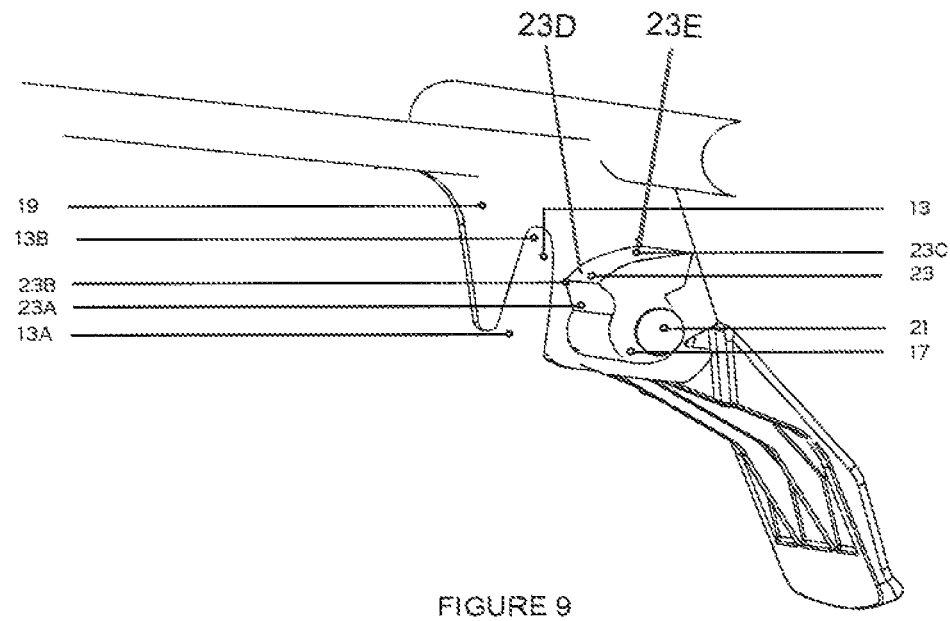
FIG. 9 is a perspective cross-sectional view of the seat part of the single tool-less attachment mechanism.

Referring to FIG. 9, the locking member 17 has a camming surface 23. When viewed from the slots 13, the camming surface has an arcuate concave surface 23a that extends to an arcuate convex surface 23c. At the intersection of the concave and convex surfaces, the camming surface has an arcuate tip 23b. When the seat 5 is placed on the chassis, the locking member 17 will initially engage the concave surface 23a. As the seat 5 is urged closer towards the chassis 3, the engagement member 15 of the seat moves upwardly in the slot 13, and the engagement between the locking member 17 and the engagement member wilt cause the locking member to pivot about the pivot pin 21. Once the engagement member has moved past the locking member 17, the locking member will be secured. The torsion spring pushes the engagement member against the closed ends of the slots when the locking member is in the locked configuration. The convex portion 23c has an initial portion 23d that is closer to the pivot pin 21 and a final portion 23e of the surface that is further away from the pivot pin 21. Any movement of the seat 5 relative to the chassis 3 will further secure or lock the engagement member and locking member 17 together.

As described in this specification, the buggy has a single tool-less attachment mechanism for attaching the underside of the seat to the chassis frame in a mounting position so that a user can selectively release the seat 5 from the chassis 3 using one hand, white supporting the seat with the other hand. In the preferred form, the single tool-less attachment mechanism includes a first pair of slots 13 and corresponding engagement member as described above. In addition, the single tool-less attachment mechanism also includes a further engagement member 25 such as a pin on the chassis frame, and a further pair of slots 27 that are complementary to the further engagement member 25 on the seat 5.

The further slots 27 and engagement member 25 are spaced from the first slots 13 and engagement member. In the form shown, the further slots are formed in the bracket 19. However, they could be formed separately from the bracket, the further pair of slots 27 is positioned towards the front of the seat and the first pair of slots 13 are positioned towards the rear of the seat. The further slots 27 and engagement member 25 are configured so that the seat 5 can be attached to the chassis 3 by initially engaging the further engagement member 25 in the further slots 27 by a generally horizontal movement of the seat relative to the chassis, and pivoting the seat 5 relative to the chassis frame 4 in a downward direction so that the first slots 13 and engagement member 15 engage with each other. The further slots 27 are forward slots and are forward-opening, and the first slot 13 are rearward slots and are downward-opening.

The seat part of the tool-less attachment mechanism is positioned beneath a forward portion of the seat 5. The tool-less attachment mechanism could be positioned beneath a derriere-supporting region of the seat 5. Alternatively, the tool-less attachment mechanism could be positioned beneath a leg-supporting region of the seat 5.

Seat/Supporting Compartment

Figure 10:
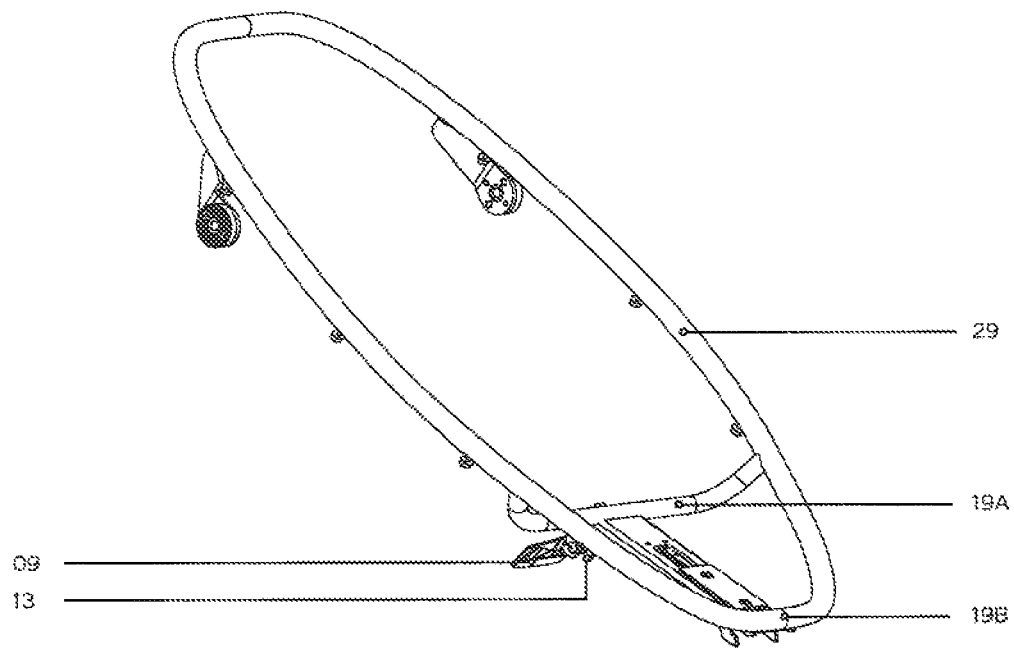
FIG. 10 is a perspective view of the seat frame.

The seat 5 has a support frame 29, shown in FIG. 10, and a seating portion 31, shown in FIGS. 1 to 3, that is supported by the support frame. In that configuration, the seat part 11 of the tool-less attachment portion is mounted to the seat support frame 29. Alternatively, the seat 5 may include a seating portion that is self-supporting, and the seat part of the tool-less attachment portion may be mounted to part of the seating portion.

The seating portion 31 is a moulded contoured polymeric component. The seating portion includes a resilient material that forms a cushion of the buggy. The seating portion 31 includes a suitable material, such as ethylene vinyl acetate (EVA) or polyethylene (PE) for example. The seating portion may include a closed cell foam. The seating portion preferably includes medium density ethylene vinyl acetate, to provide the seating portion with resilience. Polyethylene could be used if a more rigid seating portion is desired. The material may be a blend in which the EVA or PE is a major component, but which includes any additives that are required to obtain desired properties.

Figure 11:
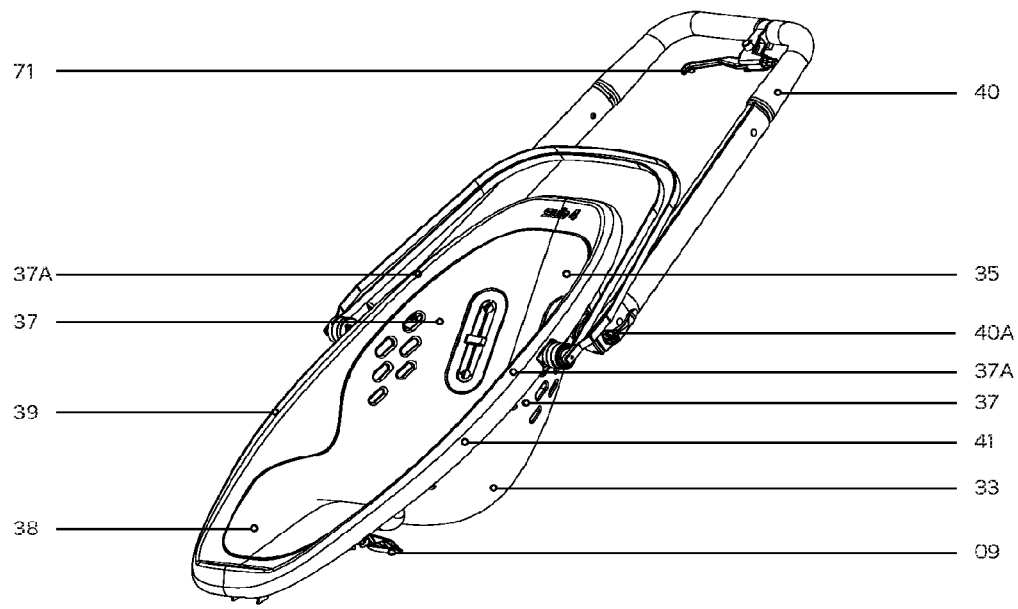
FIG. 11 is a perspective view of the seat and handle in an in use configuration.

Referring to FIG. 11, the moulded contoured seating portion 31 includes a derriere-supporting region 33, a back-supporting region 35, and two side walls 37 that extend between sides of the derriere-supporting region and the back-supporting region. The seat 5 includes a relatively rigid peripheral region 39. In the preferred form, the relatively rigid peripheral region 39 extends around the entire perimeter of the seating portion 31. In particular, the relatively rigid peripheral region 39 supports the upper edges of the side walls 37 of the seating portion, extends around and supports the outer edges of the back-supporting region 35 and supporting region 38 and the relatively rigid peripheral region 39 additionally extends around and supports an outer edge of the leg-supporting region. In a form that does not have a leg-supporting region, the peripheral region 39 preferably extends around the outer edge of the derriere-supporting region. The side walls have upper edges 37a that form a substantially straight line from the leg supporting region to the back supporting region. In an alternative form, the edge or portions of the side walls may extend above the straight line from the leg-supporting region to the back supporting region. In a further alternative form, the relatively rigid peripheral region 39 may extend along only portions of the seating portion. For example, the relatively rigid peripheral region 39 may extend along the side walls only, or along the side walls and the back-supporting region.

In the preferred form shown, the relatively rigid peripheral region 39 is provided by the seat support frame 29, with the seating portion generally suspended from the seat support frame. The seating portion is moulded with a lip 41 that engages with the support flame 29 to mount the searing portion 31 to the support frame. The lip 41 is moulded with a curvature that partly encompasses part of the support frame 29 to mount the seating portion 31 to the support frame. The lip preferably extends 41 around the periphery of the seating portion.

Alternatively, the relatively rigid peripheral region 39 could be incorporated into the moulding of the seal portion. For example, this could be achieved by moulding more rigid materials in to the relatively rigid portions of the seating portion. Alternatively that could be achieved by forming the peripheral region 39 with a large cross-sectional area.

Alternatively the relatively rigid peripheral region could be provided by a relatively rigid polymeric moulded shell (such as a PE shell for example) that is positioned behind the relatively resilient portion, and supports at least the upper edges of the side walls of the relatively resilient portion. The shell may contact and support the rear sides of the relatively resilient portion, or a spacing may be provided there between, with the only contact being at the upper edges of the side walls, and optionally at the outer edges of the back-supporting region, derriere-supporting region, and/or leg-supporting region (if applicable). Preferably, the seating portion is suspended from the peripheral region of the shell. The seating portion may have a lip that engages with the peripheral region of the shell, as described above. Such a form is shown in FIG. 21. Although not shown in the Figure, the seat will have a seat part of a tool-less attachment mechanism corresponding to that described herein.

The surfaces of the contoured seating portion may be textured surfaces. In the preferred form, portions of the upper surface of the contoured seating portion are textured surfaces. The textured surfaces are formed as part of the moulding process. Additionally, the contoured seating portion may have with symbols, such as logos or emblems. The logos or emblems are also formed as part of the moulding process.

The contoured seating portion 31 could be manufactured using any suitable known technique.

The seating portion part is preferably manufactured by moulding the seating portion as a one-piece component from a material that forms a dosed cell foam. Generally speaking, the raw materials are placed in a the in pellet or sheet form. The materials are melted and when heated they expand to fill the die to form a one-piece final seat product. After the product cures, it is removed from the die.

Figure 27:
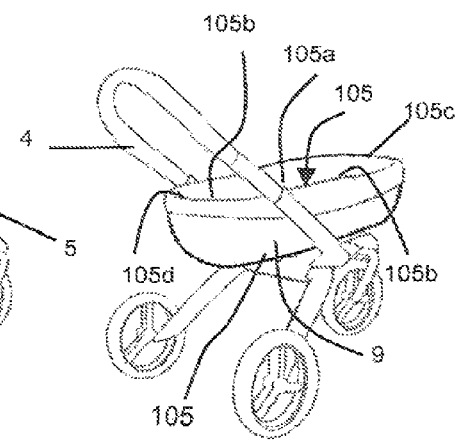

In alternative preferred forms of the embodiments described herein, an alternative supporting compartment for supporting a child in a child product is formed in a similar way. For example the supporting compartment could be a product for supporting a child in a lying position, such as a bassinet for example. Such a product is shown in FIG. 27. The moulded contoured polymeric portion has a supporting region 105a to support a child in a lying position and side walls 105b. Additionally, the moulded contoured polymeric portion will preferably have a head surrounding region 105c to generally surround the child's head and a feet surrounding region 105d to generally surround the child's feet. The head surrounding region, feet surrounding region, and the side walls extending generally upwardly from a base of the supporting region.

Again, a relatively rigid peripheral region supports at least upper edges of the side walls 105b of the moulded contoured polymeric portion. The relatively rigid peripheral region may optionally also extend around and support outer edges of the head surrounding region and feet surrounding region.

In the form shown, the relatively rigid peripheral region is provided by a rigid polymeric shell that may be moulded from a suitable material such as PE for example. The supporting region 105a includes a resilient material that forms a cushion, the supporting region includes a suitable material, such as ethylene vinyl acetate (EVA) for example.

The product for supporting a child in a lying position may have any one or more of the features outlined herein in relation to the preferred form seat. For example, at least upper edges of the side walls of the moulded contoured polymeric portion may be supported by a frame.

One possible method that could be used for manufacturing the moulded contoured portion of the seat or other supporting compartment is described in U.S. Pat. No. 7,040,706, which is incorporated herein in its entirety by way of reference.

In the preferred form shown, the seat does not have a cover or other layer covering the seat portion. The contoured seating portion 31 provides cushioning for the seated occupant. However the seat may have a decorative cover, if desired, for example a textile covering or a cushion.

Alternatively the seat portion/support portion of may be formed by moulding sheet laminates into the polymeric component to have relatively hard and relatively soft parts. For example, the seat portion/support portion may be provided with a relatively soft cushion region, with relatively hard supporting regions.

The seat has a harness that is supported from harness adjusters (not shown), for supporting a baby or toddler in the seat. The harness is an adjustable harness. In the preferred form shown, the harness adjuster is the adjuster described in our U.S. application Ser. No. 12/058,641 published as US 2008/0258527), and the contents of that application are incorporated herein in their entirety by way of reference.

Handle

Figure 12:
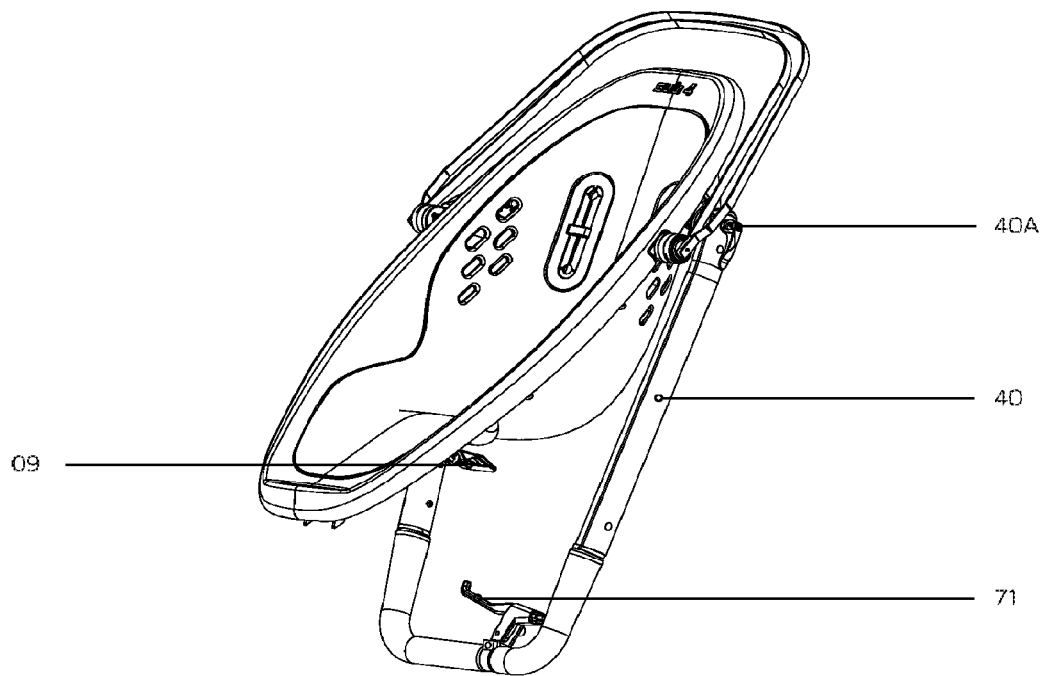
FIG. 12 is a perspective view of the seat and handle in a folded configuration.

Referring to FIGS. 11 and 12, the seat 5 includes a handle 40 that enables a user to push the buggy. The handle is attached to the seat support frame. With this configuration, when the seat 5 is detached from the chassis 3, the handle remains with the seat 5. One advantage of the handle remaining with the seat is that the size of the chassis, when in a storage configuration is smaller than if the handle remained attached to the chassis. The handle may be adjustable relative to the seat 5. The handle is pivotally attached to the frame via couplings 40a, which enable the handle to be selectively tilted relative to the frame to obtain a comfortable position for the user. The couplings may have a frictional mechanism that enables the handle to be tilted and to then maintain a tilted configuration. Rather than having a single handle, two spaced apart handle portions could be provided. The pivoting handle movement may be indexed.

The handle may also be selectively detachable from the seat 5. This configuration is particularly useful if the seat 5 can be also be used in a modular seating system as outlined below. The handle may be foldable relative to the seating portion 31 and frame, to make a compact seat configuration for storage of the seat, as shown in FIG. 12.

Chassis

Figure 13:
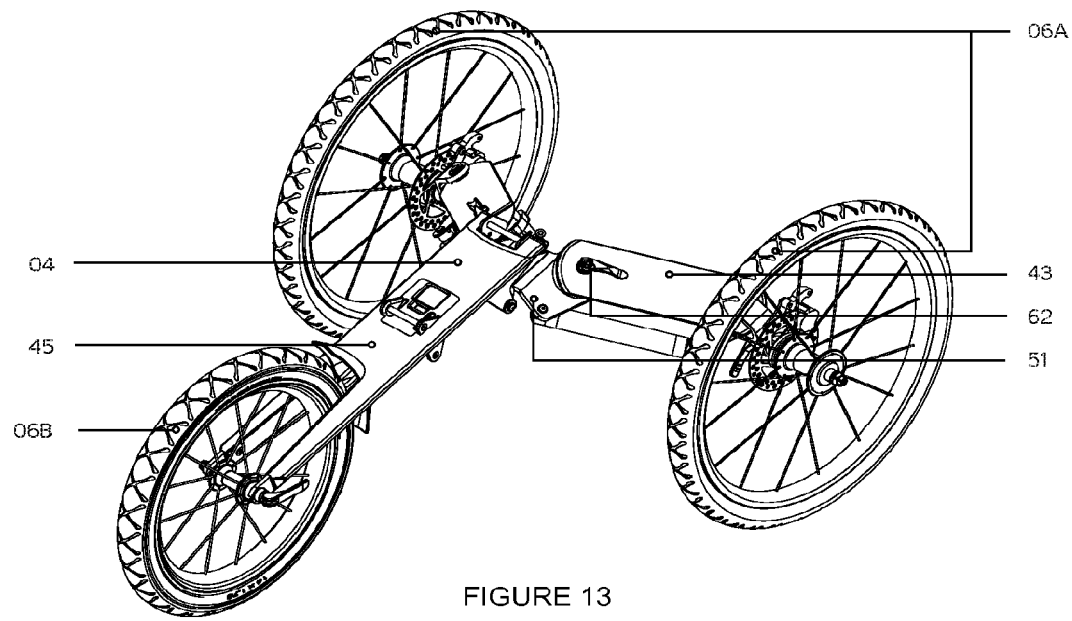
FIG. 13 is a perspective view of the chassis in an in use configuration with the arms in a most distanced arrangement.
Figure 14:
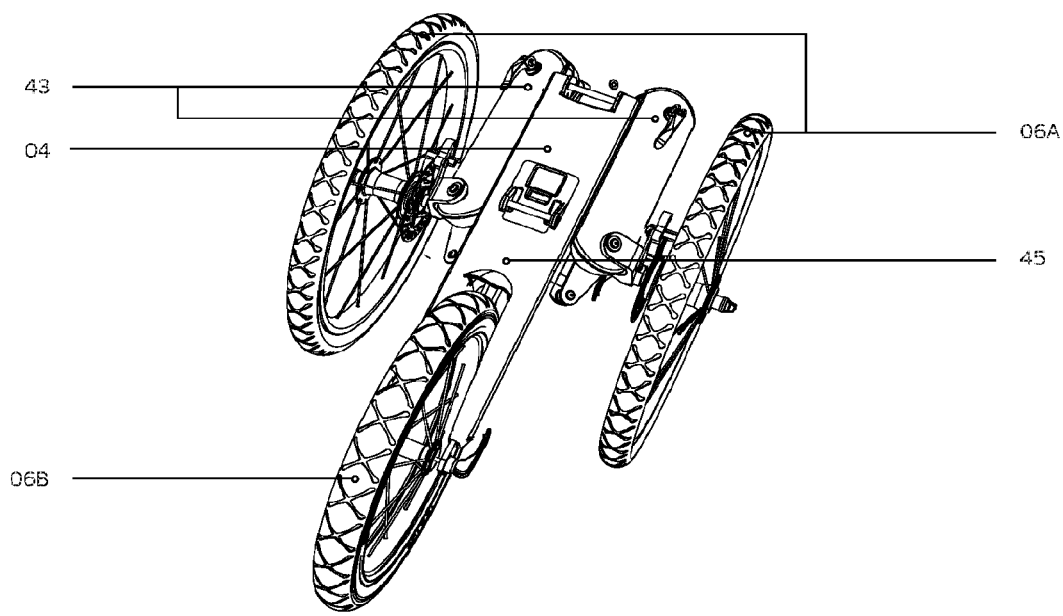
FIG. 14 is a perspective view of the chassis in a storage configuration in which the wheels are in a most compact arrangement.

Referring to FIGS. 13 and 14, the chassis frame 4 has an in-use configuration in which the wheels 6 are in a most distanced arrangement, shown in FIG. 13, and a storage configuration in which the wheels are in a most compact arrangement, shown in FIG. 14. The chassis frame 4 is foldable into the storage configuration for compact storage of the chassis frame.

The chassis 3 has two rear wheels 6a and a front wheel 6b. Two front wheels could be provided. The chassis 3 includes two rear arms 43 to support the two rear wheels 6a, and a front arm 45 to support the front wheel 6b. The rear arms extend outwardly, rearwardly and downwardly from adjacent the front arm. The front arm extends downwardly and forwardly from adjacent the rear arms. The rear arms 43 are selectively pivotable relative to the front arm 45 about linkage 62 to adjust the chassis frame 4 between the in-use configuration and the storage configuration.

Figure 16:
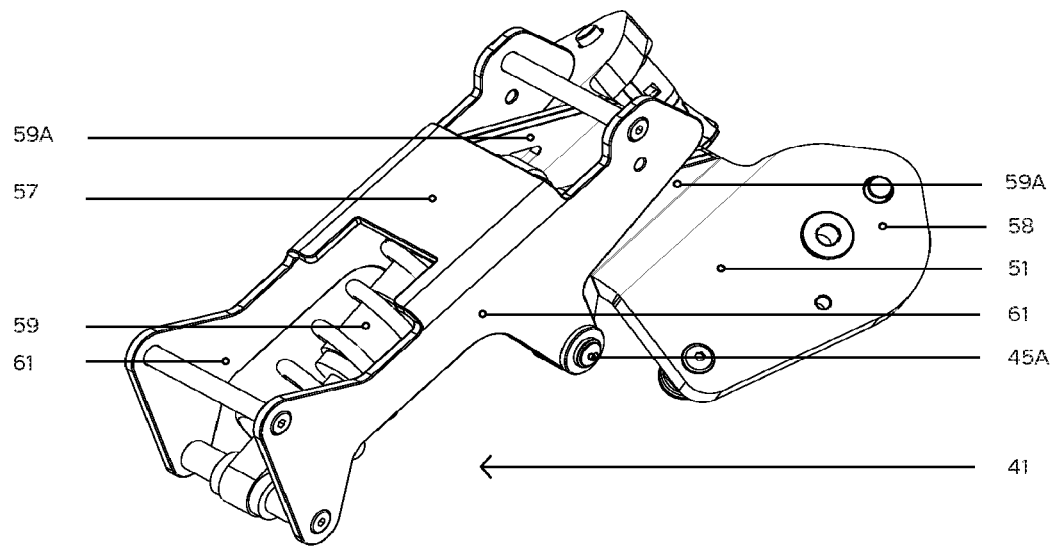
FIG. 16 is a perspective view of the suspension arrangement.
Figure 17:
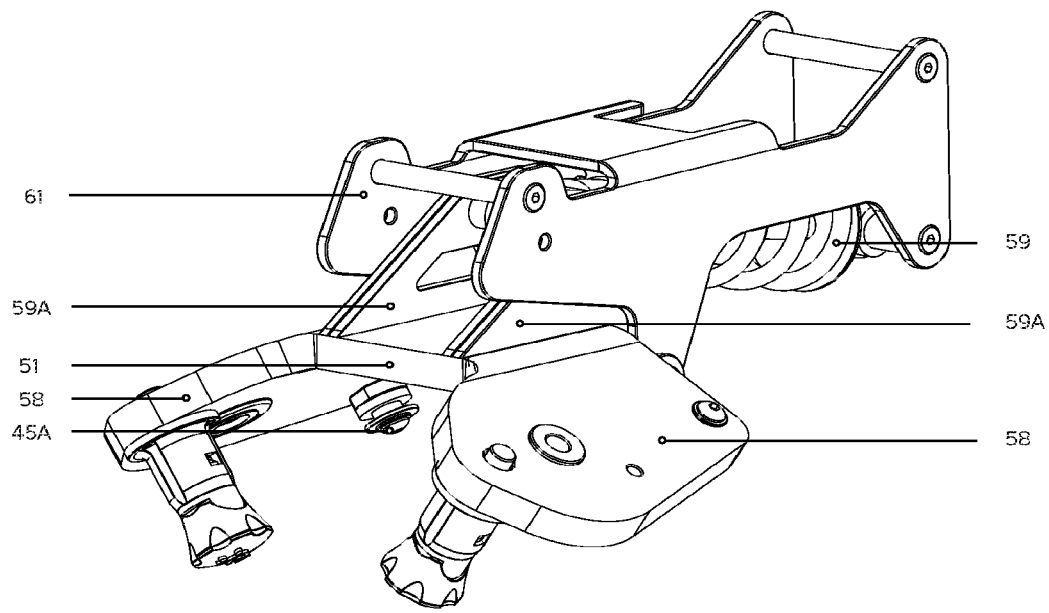
FIG. 17 is a perspective view from the front of the suspension arrangement shown in FIG. 16.

With reference to FIGS. 16 and 17, the chassis frame 4 includes a suspension arrangement 41 to provide and absorb movement between the front arm 45 and the rear arms 43. The chassis frame 4 composes a centre member 51 which is operatively connected to the real arms 43 and which is pivotally mounted to the front arm 45 at rear pivots 45a. The suspension arrangement includes a shock absorber 59 connected to the centre member 51 via a par of L-shaped components 59a. The other end of the shock absorber is fixed to the front arm via a pair of plates 61. The plates 61 are pivoted to the centre member 51 at pivots 45a. One and of the shock absorber is pivoted to the plates 59a (and thereby the centre member 51) and the other end of the shock absorber is pivoted to the plates 61. The configuration of the shock absorber is such that the wheel ends of the arms are biased downwardly, and when a bump or impact is encountered, the wheel end(s) of the arm(s) move upwardly against the bias of the shock absorber.

Each rear arm 43 is selectively pivotable relative to the centre member 57 to adjust the chassis 3 to the storage configuration. The centre member has lobes 58 extending outwardly, rearwardly, and in a downward direction from the main body of the centre member. The rear arms are pivotally mounted to the lobes 58.

Figure 15:
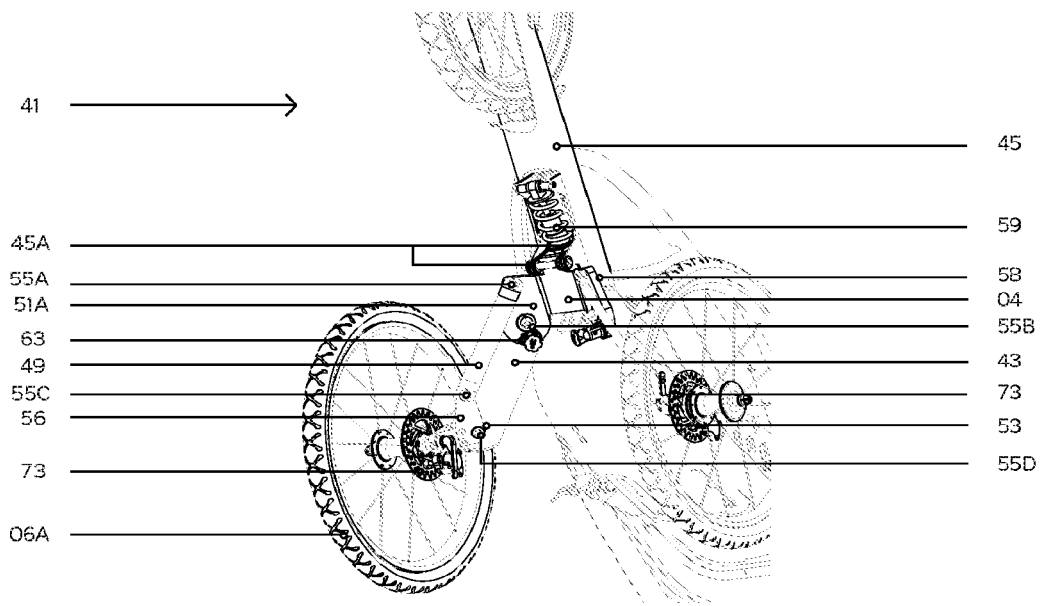
FIG. 15 is a perspective view from below of the preferred form buggy showing the suspension arrangement and brakes.

Referring to FIG. 15, each rear arm 43 composes a four bar linkage arrangement configured so that the rear wheels 6a stay substantially parallel to one another (and in a forward/rearward direction) as the chassis frame 4 is adjusted between the in-use configuration and the storage configuration. The four bar linkage arrangement has a first long arm formed by rear arm 43, a second long arm 49 formed by a link, a first short arm 51a formed by the distance between link pivot 55a and rear arm pivot 55b, and a second short arm 53 formed by a wheel support member 56 between link pivot 55c and arm pivot 55d. The first short arm is effectively formed by lobes 58 of the centre member and the second short arm is effectively formed by the wheel support member 56 between the wheels and rear arms.

The four bar linkage system is preferably a parallelogram in which the first long arm 47 and the second long arm 49 have the same length and the first short arm 51 and the second short arm 53 have the same length. Alternatively, the length of arms may be varied to provide a different pair of travel of the wheels 6 as the chassis frame 4 is adjusted between the in-use configuration and the storage configuration.

Figure 15A:
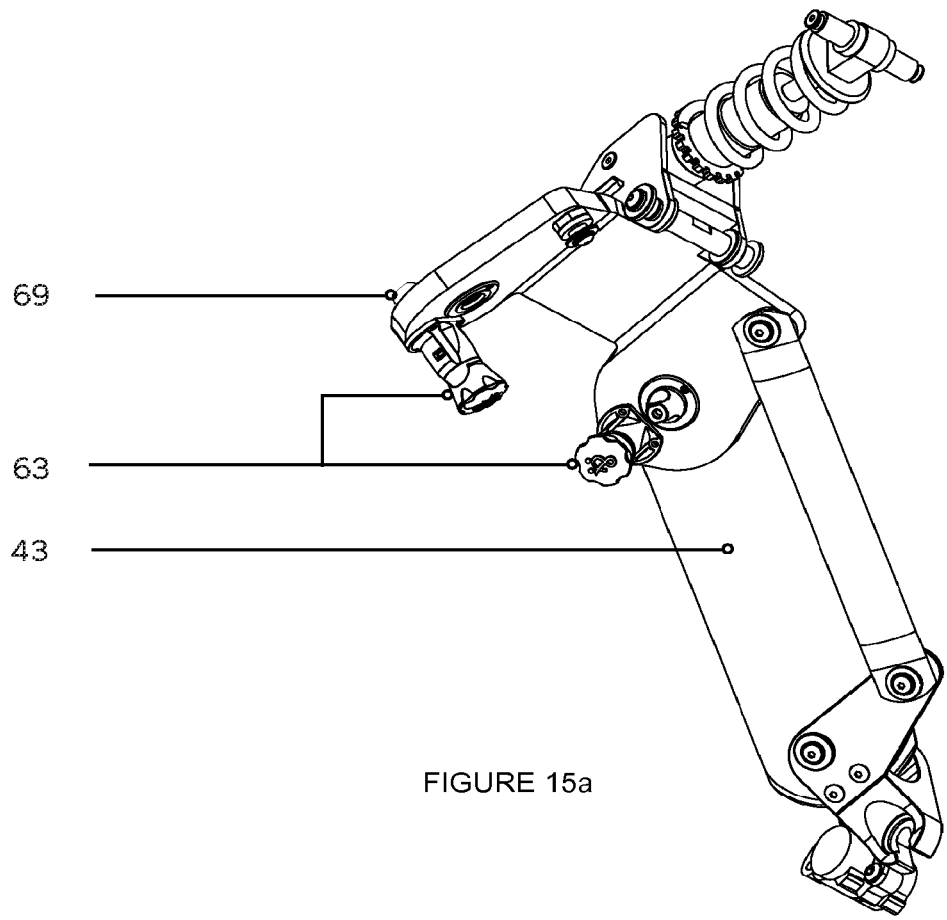
FIG. 15a is a perspective view of one of the rear arms.

With reference to FIG. 15a, the movement of each rear arm 43 is limited to move from the storage configuration to an in use configuration. Each rear arm 43 has a pin (not visible) 69. The pin is automatically secured by a lock 63. The lock is pivotally attached to the rear arm 43 at a pivot. The lock is biased towards a latching position.

Braking System

The buggy includes a braking system that operates on the wheels to enable a user to selectively slow or stop the boggy. The braking system includes a braking actuator carried by the seat 5. In the preferred form, the braking actuator composes a lever 71 (FIGS. 1 and 12). With reference to FIG. 15, the braking system further includes braking members 73 carried by the chassis 3, that are selectively engageable to brake the rear wheels.

The braking members 73 are partially engageable to enable a user to slow the buggy without fully braking the buggy. The braking members 73 may include drum brakes or disc brakes. When the buggy uses a drum brake system, the wheels can be mounted and dismounted axially. When the buggy uses a disc system, the wheels are mounted and dismounted radially. The wheels are attached to the chassis 3 using a quick release lever and cam mechanism. In the preferred form, each of the teat wheels has a disc brake. Alternatively, only one of the rear wheels or only the front wheel may have a braking member or all of the wheels may have a braking member.

Figure 18:
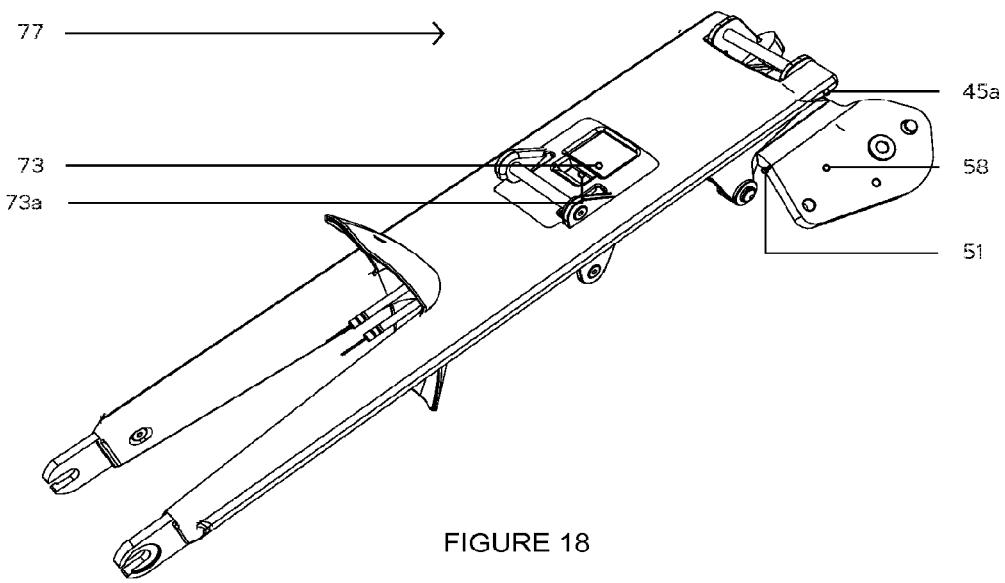
FIG. 18 is a perspective view of the front arm of the chassis and part of the chassis part of the braking system.
Figure 19:
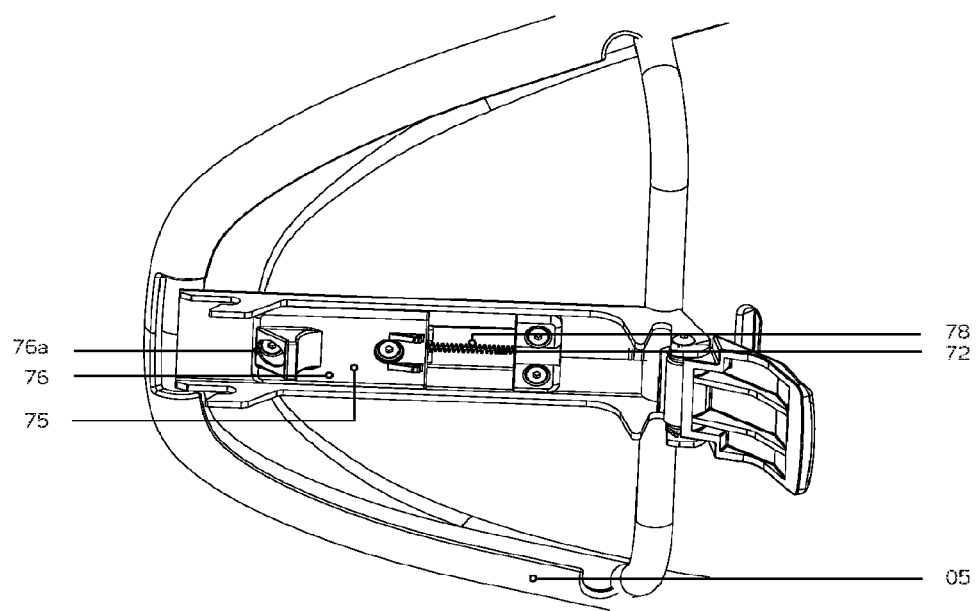
FIG. 19 is a perspective view from below of the seat and part of the at part of 10 the braking system.
Figure 25:
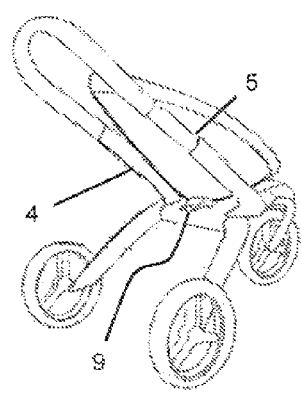

Referring to FIGS. 18 and 19, the braking system has a seat part 75 that is carried by the seat 5, and a chassis part 77 that is carried by the chassis 3. The seat part 75 could be mounted to a seat frame, on to the seating portion. In the preferred form, when the seat 5 is attached to the chassis 3, the seat part 75 and the chassis part 77 of the braking system are "coupled", so that operation of the lever 71 will cause the brake members 73 to at least partly brake the wheels. It will be appreciated that the seat part 75 and the chassis part 77 of the braking system need not actually contact with one another until the lever 71 is operated by a user. However, when the seat part 75 and the chassis part 77 of the braking system are coupled, they will be positioned such that operation of the lever 71 will cause the brake members 73 to at least partly brake the wheels 6.

The chassis part of the braking system includes a sliding block 73 that slides relative to the front arm 45. The sliding member is connected to each of the braking members via elongate members such as cables that extend from the front leg, through the sliding member and then along the length of the tear legs. The seat part of the braking system includes a sliding block 76 corresponding to the sliding block of the chassis part. The sliding block of the seat has a protrusion 76a that engages with the sliding block of the chassis in recess 73a. The sliding block 76 of the seat part slides (as indicated by arrows S) dative to the seat and is biased in a forward direction, preferably by a compression spring. The sliding member is connected to the lever 71 by an elongate member such as a cable 72. Operation of the lever will pull the cable 72, causing the sliding block 76 to slide rearwardly. The rearward movement of protrusion 76a will pull the chassis sliding block 73 rearwardly and the brake members will be activated to at least partially brake the wheels. The brake members are preferably biased via a spring 78 into a non-braking position, which biases the sliding block of the chassis part into a non-braking position through the cables that connect the brake members to the sliding block. The braking system is configured such that increased movement of the lever 71 will cause increased movement of the brake members.

In the preferred form, when the seat 5 is detached from the chassis 3, the sliding block of the seat part and the sliding block of the chassis part of the braking system automatically decouple (separate). When the seat 5 is attached to the chassis 3, the sliding block of the seat part and the sliding block of the chassis part of the braking system automatically couple, so that the braking system needs no interaction from a user to separate or reattach the parts of the braking system.

The lever 71 can be actuated by a single hand of a user, and that is positioned on a handle of the buggy. The actuator could alternatively be of a different type. For example, the braking system actuation could be incorporated into the pushing handle of the buggy, such that pivoting the handle causes the braking member(s) to at least partly brake the wheel(s). Such an actuation system is described in our PCT application number PCT/NZ2008/000174 (published as WO2009/035342), and the contents of that application are incorporated herein in their entirety by way of reference. However, for the present system, that braking system would be modified so that the seat 5 can be detached from the chassis frame 4 with a seat part of the braking system automatically decoupling from the chassis part.

The seat 5 is attachable to the chassis frame 4 in a primary seating position. When the seat 5 is attached to the frame, the seat is forward-facing. The seat 5 is detachable from the primary seating position and is attachable to the frame in a secondary seating position at least partly behind and preferably at least partly below the primary seating position. When the seat 5 is attached to the frame, in the secondary seating position, the seat is forward-facing.

The primary seating position is the main (front) seating position in the case of a dual seat buggy, or is the only seating position in the case of a single seat buggy. The attachment of the seat 5 in the secondary seating position is via the same type of tool-less attachment mechanism as the attachment in the primary seating position. In this alternative form, the chassis frame 4 includes two chassis parts of the tool-less attachment mechanism, with the front chassis part defining a first mounting position for the seat and the rear chassis part defining a second mounting position for the seat, with the seat part of the tool-less attachment mechanism being attachable to either of the chassis parts of the tool-less attachment mechanism so the seat 5 can be attached in the primary or secondary seating position. FIG. 20 shows an alternative form buggy having two seats attached to the frame via the tool-less attachment mechanism in primary and secondary seating positions.

The buggy may be provided with two seats, each having a seat part of a tool-less attachment mechanism that is engageable with either of two chassis parts of the tool-less attachment mechanism. Each seat is preferably of the type outlined above, and includes a moulded contoured polymeric component.

Figure 26:
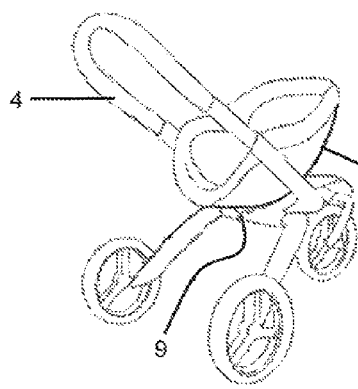

In another alternative form, the seat 5 may be convertible from a sitting configuration for supporting a toddler to a lying configuration for supporting a baby. The tool-less attachment mechanism, or the position of the tool-less attachment mechanism relative to the seat 5 or chassis frame, is adjustable to provide the conversion. FIG. 26 shows an alternative form in which the seat 5 is converted to a semi-reclined position. FIG. 27 shows another alternative form in which the passenger compartment is a bassinet type support 105 for supporting a baby in lying position. As described above in relation to the seat of the buggy, the tool-less attachment mechanism of the bassinet configuration has a passenger support part that is mounted to the underside of the bassinet, and a chassis part mounted to the chassis frame.

The bassinet is removable and interchangeable with one of the seats 5.

The chassis will preferably have the same configuration as described above.

Modular Supporting System

The seat of the preferred form may also be part of a modular supporting system for supporting a child. The modular system includes a first passenger compartment in the form of the seat as described above, a first base, and a further base. The seat is selectively attachable to the bases to provide alternative child seating products. In the form having a seat, the modular supporting system is a modular seating system.

The modular supporting system may have a further compartment for supporting a child, such as a bassinet for example. The further passenger support is selective attachable to the bases to provide further alternative child supporting products.

The first base is a buggy base having a wheeled buggy chassis, as described above. The seat is supported from the chassis frame in a generally upright configuration when attached to the chassis frame. The further base includes one of: a high chair frame 304, a bouncer frame 204, a car seat frame 104. FIG. 22 is a schematic drawing showing the seat 5 attached to a car seat frame 104 by a tool-less attachment mechanism to provide a car seat. FIG. 23 is a schematic drawing showing the seat 5 attached to a bouncer frame 204 to provide a bouncer. The bouncer frame 204 will have some resilience to enable the bouncer to bounce. FIG. 24 is a schematic drawing showing the seat 5 attached to a high chair frame 304 to provide a high chair. The tool-less attachment mechanism is suitably of the type of tool-less attachment mechanism described in relation to the buggy.

With reference to FIG. 27, the further passenger support compartment 105 includes a bassinet for supporting a baby or child in a lying position. Preferably, the bassinet is supported from the chassis frame in a generally horizontal configuration when attached to the chassis frame. The bassinet may be an alternative passenger support to the seat described above. With reference to FIG. 26, the seat described above may be supported from the chassis frame in partly- or fully-reclined configuration when attached to the chassis frame to form a bassinet type passenger support.

The seat is selectively attachable to the bases by a tool-less attachment mechanism, enabling the seat to be selectively attached to the first base in the primary seating position to provide the wheeled boggy or to the further base to provide the alternative child seating product. As described above in relation to the buggy, the tool-less attachment mechanism has a seat part that is mounted to the seat and a chassis part mounted to the chassis frame. The tool-less attachment mechanism also has a further base part mounted to the further base, with the seat part of the tool-less attachment mechanism selectively engageable with the chassis part or the further base part to attach the seat to the first base to form the buggy or the further base to form the further child seating product.

The modular seating or supporting system includes a plurality of further bases 104, 204, 304, each of which includes a further base part of the single tool-less attachment mechanism so the seat can be selectively attached to the further bases. That is, the car seat frame has a further base part (not visible) of the single tool-less attachment mechanism for selective engagement with the seat part of the tool-less attachment mechanism, the bouncer frame has a further base part (not visible) of the single tool-less attachment mechanism for selective engagement with the seat part of the tool-less attachment mechanism, and the car seat frame has a further base part (not visible) of the single tool-less attachment mechanism for selective engagement with the seat part of the tool-less attachment mechanism.

As described above, the tool-less attachment mechanism includes a release actuator, in the form of a lever 9, to enable a user to selectively release the seat 5 from the buggy chassis 3. The lever 9 is configured for single-handed use, so that a user can selectively release the seat 5 from each frame using one hand, while supporting the seat with the other hand.

Each of the further bases 104, 204,304 will also have a further engagement member 25 of the type described above on the chassis frame that is received by the further slots 27 as described above on the seat 5. The bassinet 105 will have a bassinet part of the tool-less attachment mechanism corresponding to the seat part of the tool-less attachment mechanism, so the bassinet can be interchanged with the seat.

FIGS. 22 to 26 show a seat 5 of the type described above having the relatively rigid peripheral region 501 provided by the relatively rigid polymeric moulded shell 503 (such as a PE shell for example) that is positioned behind the relatively resilient portion 505 (such as an EVA or EVA blend material for example), and supports at least the upper edges 507 of the side walls of the relatively resilient portion. The shell may contact and support the rear sides of the relatively resilient portion, or a spacing may be provided there between, with the only contact being at the upper edges of the side walls, and optionally at the outer edges of the back-supporting region, derriere-supporting region, and/or leg-supporting region (if applicable). Those regions of contact preferably support the resilient portion 505. The seat part of a single tool-less attachment mechanism may be mounted to or in the relatively rigid shell.

Alternatively, the seat may be of the type described above having the relatively rigid peripheral region 39 provided by the seat support frame 29, with the seating portion generally suspended from the seat support frame.

In an alternative configuration, each base (including the buggy chassis) may have a base part corresponding to the seat part described above, with the engagement members on the seat. However, a disadvantage of that configuration is that each base requires a release actuator. For that reason, it is preferred that the actuator is on the seat part, and each base has an attachment mechanism part corresponding to the chassis pan described above and shown in the Figures.

The seat can be released from engagement with a respective base by operation of a single actuator.

The above describes preferred forms of the embodiments described herein, and modifications can be made thereto without departing from the scope of the embodiments.

The buggy is described as a three wheel buggy. Rather than having a single front wheel, dual front wheels could be provided in some configurations.

Various couplings are shown by way of example only, and different coupling or attachment means could be used while still providing the desired functionality. For example, the handle couplings are described as being frictional mechanism to enable tilting of the handle to selected positions relative to the frame. Alternatively, the handle could be fixed relative to the frame, or locking couplings could be used.

While the preferred form buggy is shown as an "all terrain" type of buggy that is suitable for some off road use, it will be appreciated that the embodiments described herein can be applied to any suitable type of pushing vehicle for transporting a child or children. Therefore, the term "buggy" as used in this specification and claims should be interpreted to cover other alternative pushing vehicles for transporting children, such as strollers, push chairs, perambulators, and the like.

Other possible modifications are listed in the "Summary" section.

Embodiments described herein have been described by way of example only and it should be appreciated that modifications and additions may be made thereto without departing from the scope of the claims herein.

The invention claimed is:

1. A supporting compartment that directly supports a child in a child product and is fitted to a support frame in a child product, the supporting compartment comprising:
   a moulded contoured polymeric portion that includes a supporting region for at least partly supporting a child, and two side walls that extend from sides of the supporting region, wherein at least part of the moulded contoured polymeric portion is resilient; and
   a relatively rigid peripheral region that secures at least part of upper edges of the side walls of the moulded contoured polymeric portion to a support frame on a child product;
   wherein the moulded contoured polymeric portion includes at least one lip that engages with the support frame to mount the moulded contoured polymeric portion to the support frame and the support frame has an elliptical shape and the lip extends around the circumference of the frame.

2. The supporting compartment as claimed in claim 1 wherein the supporting compartment includes a seat having a seating portion, and the supporting region includes a derriere-supporting region and a back-supporting region of the seating position, and the side walls extend between the sides of the derriere-supporting region and the back-supporting region.

3. The supporting compartment as claimed in claim 2 wherein the derriere-supporting region and the back-supporting region are angled relative to one another.

4. The supporting compartment as claimed in claim 1 wherein the supporting compartment includes a product for supporting a child in a lying position and the supporting region is adapted to support the child in a lying position.

5. The supporting compartment as claimed in claim 1 wherein the moulded contoured polymeric portion has a head surrounding region to generally surround the child's head and a feet surrounding region to generally surround the child's feet, with the head surrounding region, feet surrounding region, and the side walls extending generally upwardly from a base of the supporting region.

6. The supporting compartment as claimed in claim 1 wherein the moulded contoured polymeric portion is manufactured from ethylene vinyl acetate (EVA).

7. The supporting compartment as claimed in claim 1 wherein the relatively rigid peripheral region is provided by a support frame, with the moulded contoured polymeric portion generally suspended from the support frame.

8. The supporting compartment as claimed in claim 1 wherein the child product is a buggy.

9. A buggy comprising a supporting compartment as claimed in claim 1.

10. The supporting compartment as claimed in claim 1 wherein the child product is a high chair.

11. A high chair comprising a supporting compartment as claimed in claim 1.

* * * * *